(12) United States Patent
Chae et al.

(10) Patent No.: US 11,689,337 B2
(45) Date of Patent: Jun. 27, 2023

(54) METHOD AND APPARATUS FOR TRANSCEIVING SIGNAL OF DEVICE-TO-DEVICE COMMUNICATION TERMINAL IN WIRELESS COMMUNICATION SYSTEM

(71) Applicant: LG ELECTRONICS INC., Seoul (KR)

(72) Inventors: Hyukjin Chae, Seoul (KR); Hanbyul Seo, Seoul (KR); Inkwon Seo, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/444,457

(22) Filed: Aug. 4, 2021

(65) Prior Publication Data

US 2021/0368454 A1 Nov. 25, 2021

Related U.S. Application Data

(63) Continuation of application No. 15/739,878, filed as application No. PCT/KR2016/006846 on Jun. 27, 2016, now Pat. No. 11,115,938.

(Continued)

(51) Int. Cl.
*H04L 5/00* (2006.01)
*H04W 72/12* (2023.01)
(Continued)

(52) U.S. Cl.
CPC ........ *H04L 5/0053* (2013.01); *H04L 27/2602* (2013.01); *H04W 52/36* (2013.01);
(Continued)

(58) Field of Classification Search
CPC . H04W 52/36; H04W 52/325; H04W 52/346; H04W 52/383; H04W 72/0406;
(Continued)

(56) References Cited

U.S. PATENT DOCUMENTS

2011/0080903 A1 4/2011 Yin et al.
2012/0213183 A1 8/2012 Chen et al.
(Continued)

FOREIGN PATENT DOCUMENTS

CN 103686753 3/2014
WO 2014/126514 8/2014
(Continued)

OTHER PUBLICATIONS

European patent application No. 16814769.2, European search report dated Apr. 15, 2019, 17 pages.
(Continued)

*Primary Examiner* — Raymond S Dean
(74) *Attorney, Agent, or Firm* — Lee Hong Degerman Kang & Waimey

(57) ABSTRACT

An embodiment of the present invention provides a method in which a terminal transmits a device-to-device (D2D) signal in a wireless communication system. The D2D signal transmission method includes: transmitting D2D control information; and transmitting D2D data corresponding to the D2D control information, wherein the D2D control information and the D2D data are transmitted in the same subframe, and the D2D control information and the D2D data are always adjacent to each other in the frequency axis.

10 Claims, 24 Drawing Sheets

Related U.S. Application Data

(60) Provisional application No. 62/339,743, filed on May 20, 2016, provisional application No. 62/320,605, filed on Apr. 10, 2016, provisional application No. 62/317,475, filed on Apr. 1, 2016, provisional application No. 62/316,559, filed on Mar. 31, 2016, provisional application No. 62/251,094, filed on Nov. 4, 2015, provisional application No. 62/184,922, filed on Jun. 26, 2015.

(51) Int. Cl.

| | | |
|---|---|---|
| *H04W 52/38* | (2009.01) | |
| *H04L 27/26* | (2006.01) | |
| *H04W 72/20* | (2023.01) | |
| *H04W 52/36* | (2009.01) | |
| *H04W 76/14* | (2018.01) | |
| *H04W 74/04* | (2009.01) | |
| *H04W 52/34* | (2009.01) | |
| *H04W 52/32* | (2009.01) | |

(52) U.S. Cl.
CPC ......... *H04W 52/383* (2013.01); *H04W 72/12* (2013.01); *H04W 72/20* (2023.01); *H04W 74/04* (2013.01); *H04W 76/14* (2018.02); *H04L 5/005* (2013.01); *H04L 5/0051* (2013.01); *H04W 52/325* (2013.01); *H04W 52/346* (2013.01)

(58) Field of Classification Search
CPC ...... H04W 72/12; H04W 74/04; H04L 5/005; H04L 5/0051; H04L 5/0053; H04L 27/2602

See application file for complete search history.

(56) References Cited

U.S. PATENT DOCUMENTS

| | | | |
|---|---|---|---|
| 2013/0077466 A1 | 3/2013 | Takaoka et al. | |
| 2013/0182676 A1 | 7/2013 | Lee et al. | |
| 2013/0223353 A1 | 8/2013 | Liu et al. | |
| 2014/0078961 A1 | 3/2014 | Shen et al. | |
| 2014/0112163 A1 | 4/2014 | Park et al. | |
| 2014/0295836 A1 | 10/2014 | Frenger et al. | |
| 2015/0016410 A1 | 1/2015 | Lee et al. | |
| 2015/0078279 A1 | 5/2015 | Ko et al. | |
| 2015/0304962 A1 | 10/2015 | Fabien et al. | |
| 2016/0020822 A1 | 1/2016 | Li et al. | |
| 2016/0135239 A1 | 5/2016 | Khoryaev et al. | |
| 2016/0226690 A1 | 8/2016 | Hessler et al. | |
| 2016/0234763 A1* | 8/2016 | Um ................... | H04W 72/23 |
| 2016/0249355 A1 | 8/2016 | Chae et al. | |
| 2016/0295624 A1* | 10/2016 | Novlan ............... | H04L 67/12 |
| 2017/0105209 A1 | 4/2017 | Sorrentino et al. | |
| 2017/0295601 A1 | 10/2017 | Kim et al. | |
| 2018/0036808 A1 | 2/2018 | Ballas | |
| 2018/0069664 A1 | 3/2018 | Khoryaev et al. | |
| 2018/0234220 A1 | 8/2018 | Yasukawa et al. | |
| 2018/0249518 A1 | 8/2018 | Nguyen | |
| 2019/0356451 A1* | 11/2019 | Zhang ................. | H04B 17/327 |
| 2019/0387377 A1* | 12/2019 | Zhang ................. | H04W 84/005 |
| 2020/0099476 A1* | 3/2020 | Park .................... | H04L 1/1812 |
| 2020/0145270 A1* | 5/2020 | Nguyen .............. | H04W 4/40 |
| 2021/0211219 A1* | 7/2021 | Sarkis ................. | H04L 5/0044 |
| 2021/0250954 A1* | 8/2021 | Li ....................... | H04L 1/1887 |

FOREIGN PATENT DOCUMENTS

| | | |
|---|---|---|
| WO | 2015-021185 | 2/2015 |
| WO | 2015065014 | 5/2015 |
| WO | 2015069080 | 5/2015 |

OTHER PUBLICATIONS

CATT, "Resource pool configuration for D2D communication," 3GPP TSG RAN WG1 Meeting #78bis, R1-143741, Ljubljana, Slovenia, Oct. 6-10, 2014, 4 pages.

Huawei, HiSilicon, "Multiplexing of SA and data," 3GPP TSG RAN WG1 Meeting #82bis, R1-156101, Malmo, Sweden, Oct. 5-9, 2015, 8 pages.

European patent application No. 16814769.2, European search report dated Dec. 10, 2018, 15 pages.

3GPP TS 36.213 V12.5.0 (Mar. 2015), XP050928106, 240 pages.

LG Electronics, "Further details on D2D transmission power control," 3GPP TSG RAN WG1 Meeting #79, R1-144885, San Francisco, US, Nov. 17-21, 2014, 6 pages.

PCT International Application No. PCT/KR2016/006846, Written Opinion of the International Searching Authority dated Sep. 29, 2016, 18 pages.

ZTE, "SA and Data Resource Selection for D2D Communication Mode 2", 3GPP TSG RAN WG1 Meeting #78, R1-143138, Aug. 2014, 3 pages.

European patent application No. 16814769.2, European Office Action dated Nov. 4, 2019, 7 pages.

Chinese application No. 201680037611.0, Office Action dated Aug. 28, 2020, 20 pages.

European Patent Office Application Serial No. 22160486.1, Search Report dated Jun. 20, 2022, 11 pages.

ZTE, "Discussion on T-RPT Scheme for Mode 1 and Mode 2," R1-143135, 3GPP TSG-RAN WG1 Meeting #78, Aug. 2014, 9 pages.

Nokia et al., "Further discussion on scheduling assignments," R1-143246, 3GPP TSG-RAN WG1 Meeting #78, Aug. 2014, 4 pages.

\* cited by examiner

FIG. 5
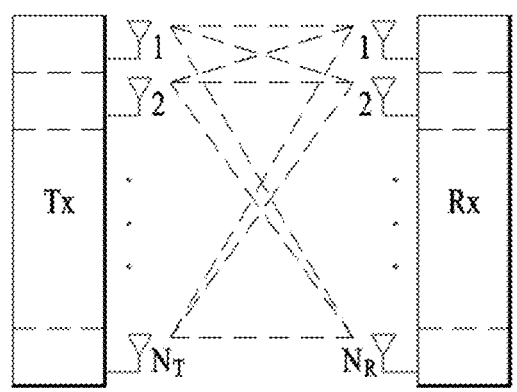
(a)
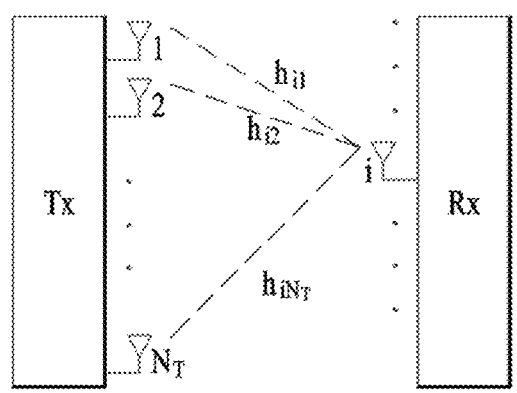
(b)

FIG. 8
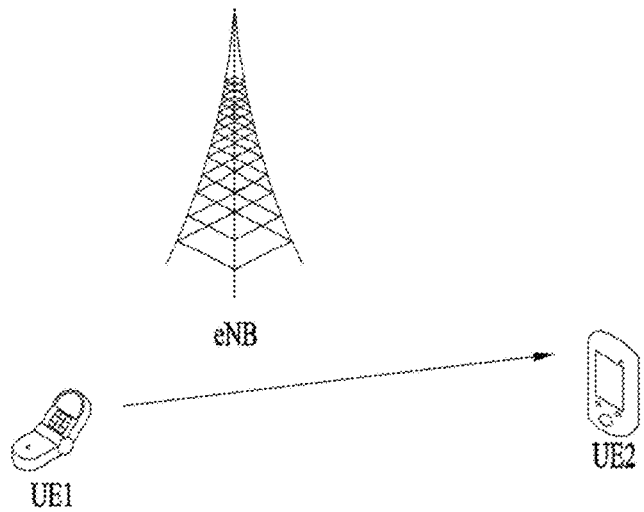
(a)
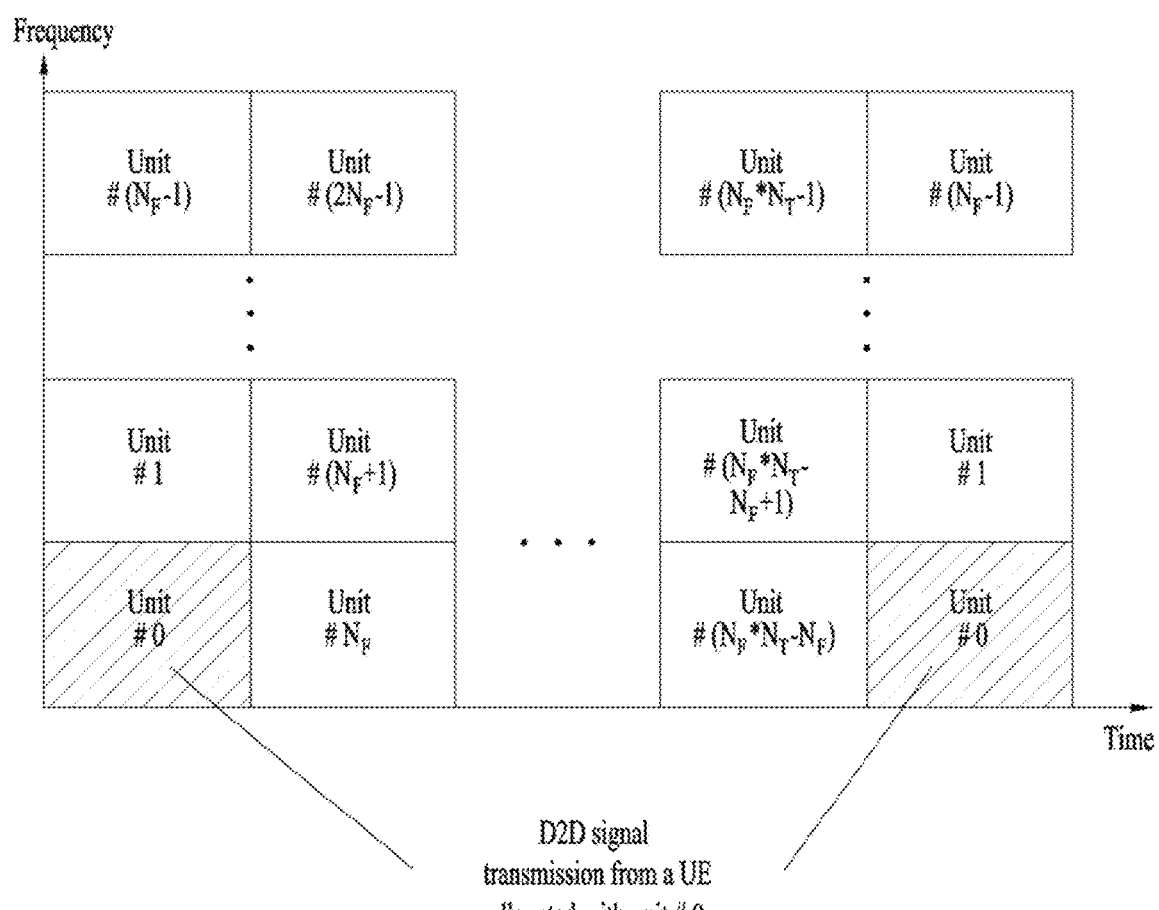
(b)

FIG. 13
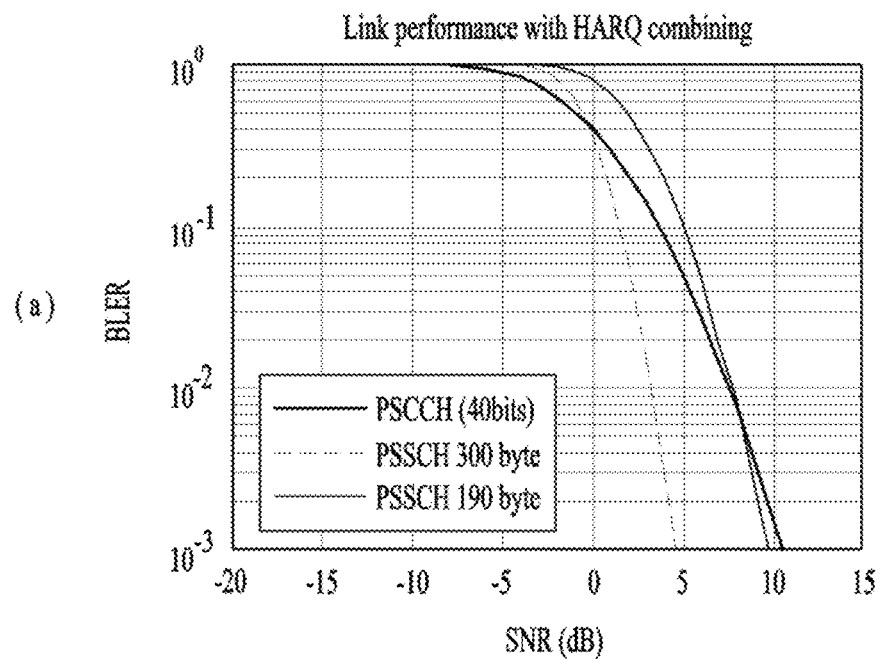
(a)
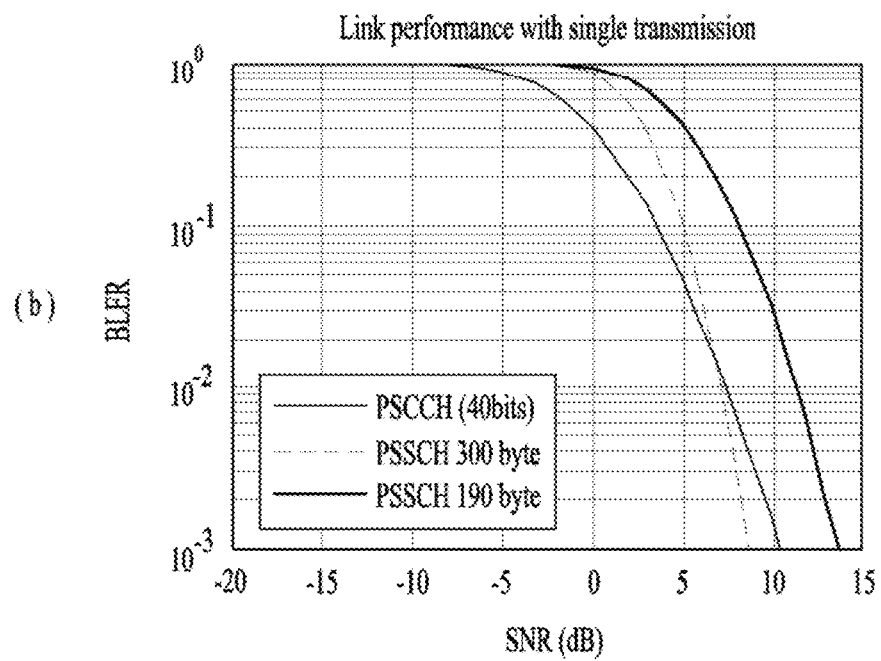
(b)

FIG. 17
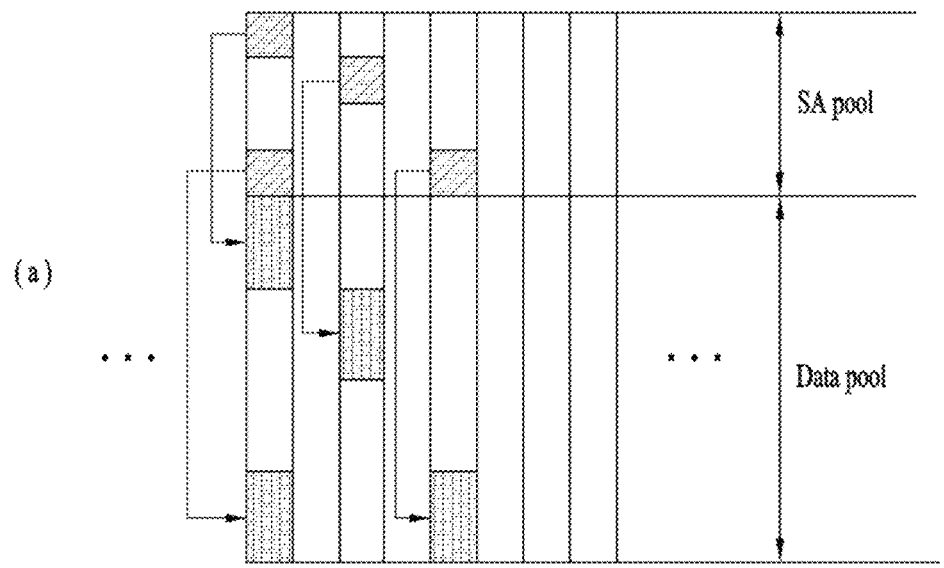
(a)
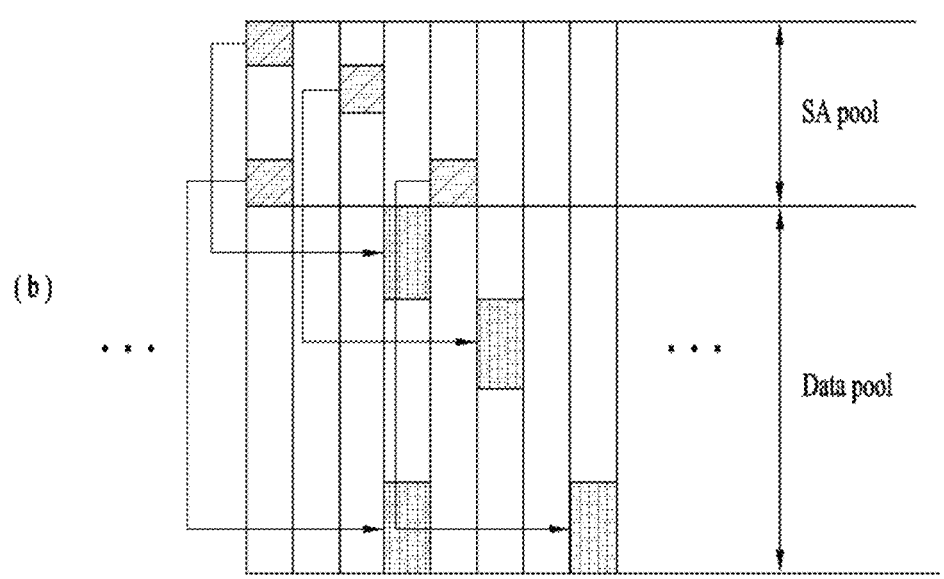
(b)

FIG. 19
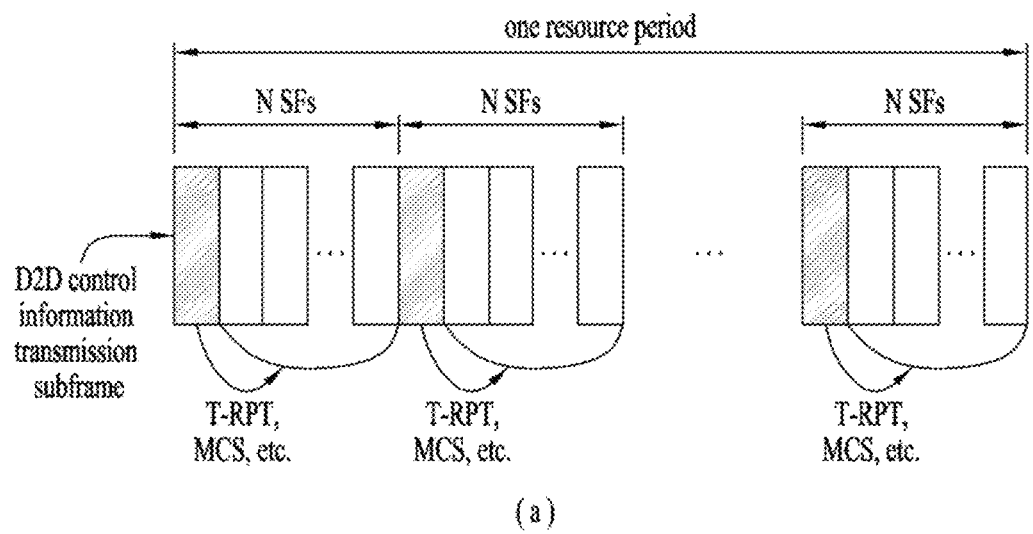
(a)
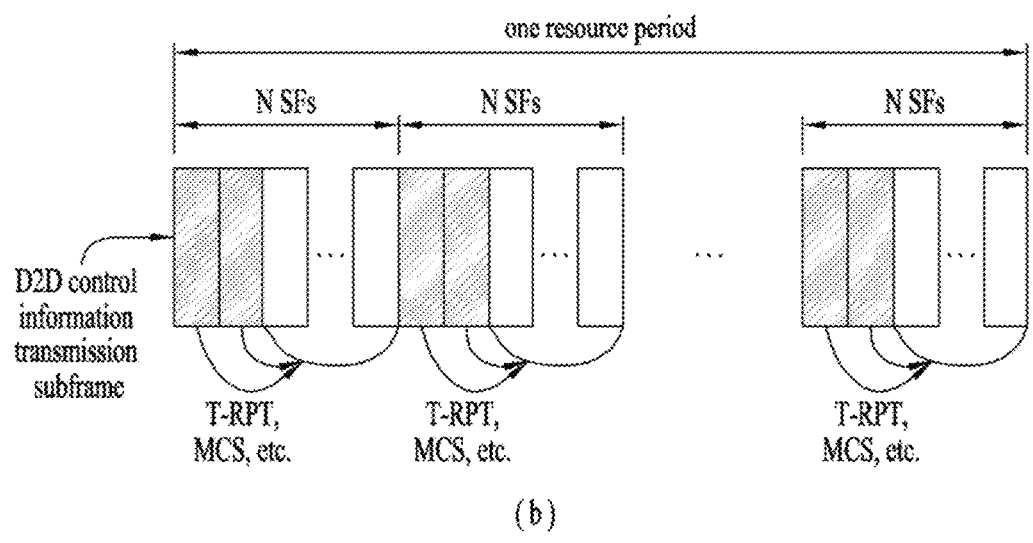
(b)

FIG. 20
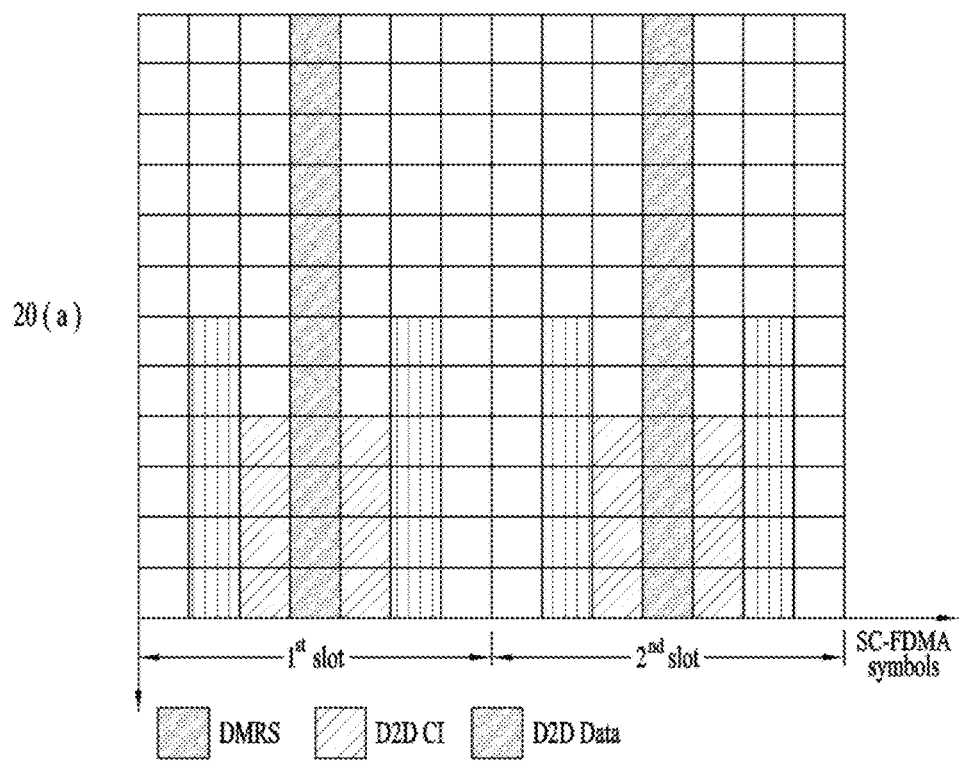
20(a)
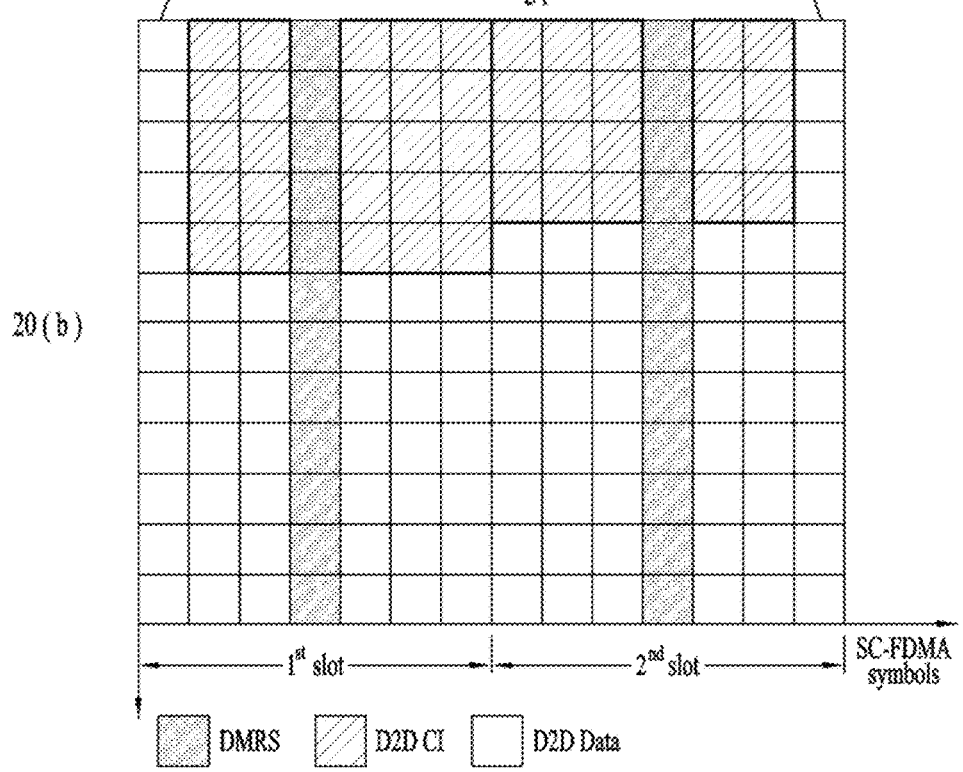
20(b)

FIG. 21
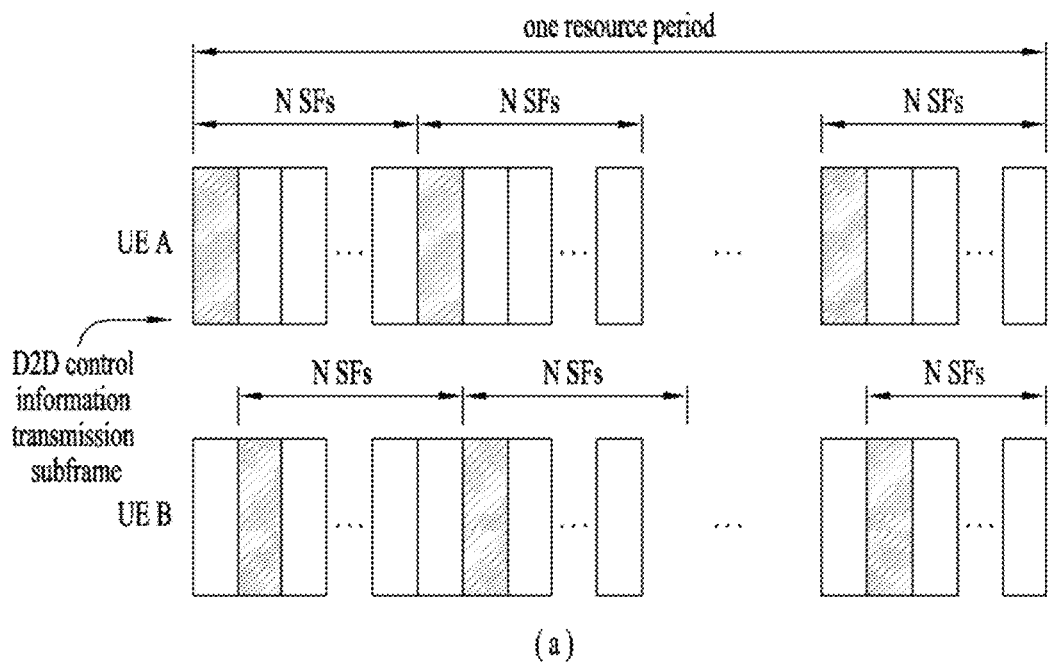
(a)
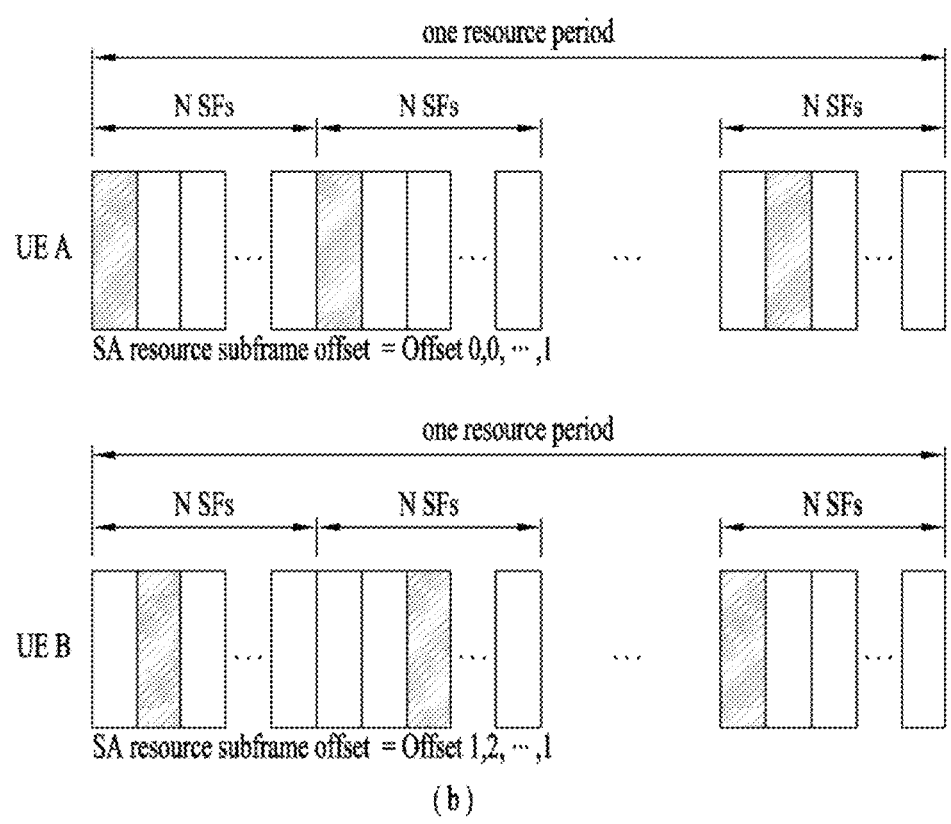
(b)

FIG. 23
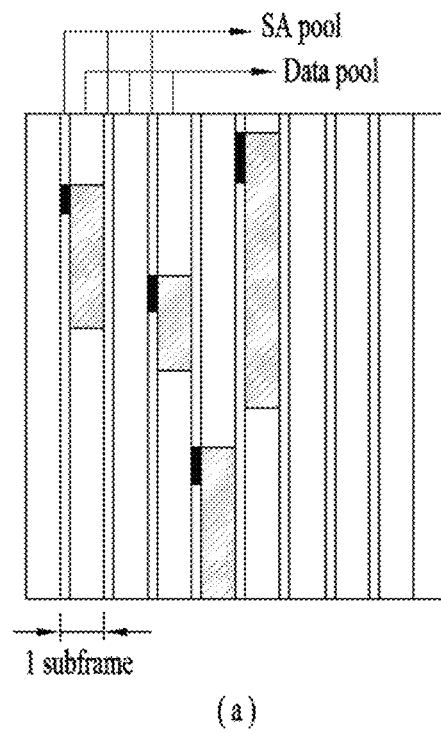
(a)
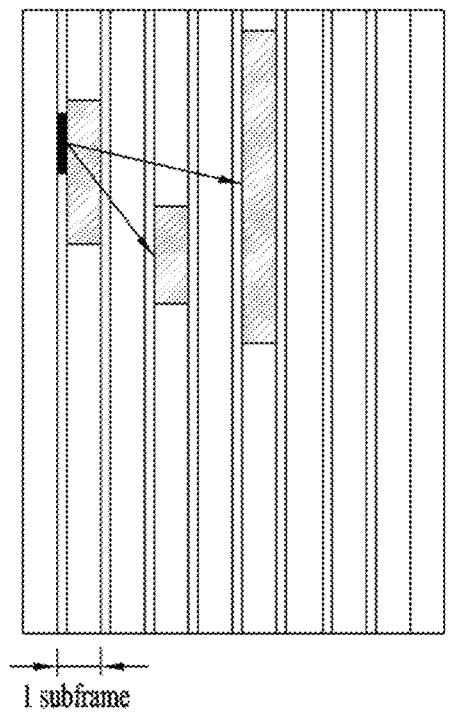
(b)
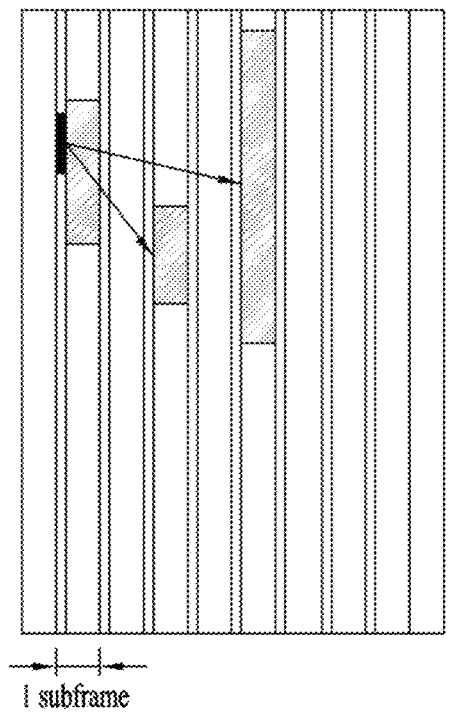
(c)

METHOD AND APPARATUS FOR TRANSCEIVING SIGNAL OF DEVICE-TO-DEVICE COMMUNICATION TERMINAL IN WIRELESS COMMUNICATION SYSTEM

This application is a continuation of U.S. patent application Ser. No. 15/739,878, filed on Dec. 26, 2017, which is the National Stage filing under 35 U.S.C. 371 of International Application No. PCT/KR2016/006846, filed on Jun. 27, 2016, which claims the benefit of U.S. Provisional Application No. 62/184,922, filed on Jun. 26, 2015, 62/251,094, filed on Nov. 4, 2015, 62/316,559, filed on Mar. 31, 2016, 62/317,475, filed on Apr. 1, 2016, 62/320,605, filed on Apr. 10, 2016 and 62/339,743, filed on May 20, 2016, the contents of which are all hereby incorporated by reference herein in their entireties.

TECHNICAL FIELD

Following description relates to a wireless communication system, and more particularly, to a method of transmitting a signal for dynamically changing/indicating a position of a resource transmitted by a transmitter and an apparatus therefor.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

D2D communication is a communication scheme in which a direct link is established between User Equipments (UEs) and the UEs exchange voice and data directly without an evolved Node B (eNB). D2D communication may cover UE-to-UE communication and peer-to-peer communication. In addition, D2D communication may be applied to Machine-to-Machine (M2M) communication and Machine Type Communication (MTC).

D2D communication is under consideration as a solution to the overhead of an eNB caused by rapidly increasing data traffic. For example, since devices exchange data directly with each other without an eNB by D2D communication, compared to legacy wireless communication, network overhead may be reduced. Further, it is expected that the introduction of D2D communication will reduce procedures of an eNB, reduce the power consumption of devices participating in D2D communication, increase data transmission rates, increase the accommodation capability of a network, distribute load, and extend cell coverage.

Currently, discussion on V2X communication associated with D2D communication is in progress. The V2X communication corresponds to a concept including V2V communication performed between vehicle UEs, V2P communication performed between a vehicle and a UE of a different type, and V2I communication performed between a vehicle and an RSU (roadside unit).

DISCLOSURE OF THE INVENTION

Technical Task

A technical task of the present invention is to provide a method of dynamically transmitting a position of a resource transmitted by a transmitter.

Technical tasks obtainable from the present invention are non-limited by the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of transmitting a D2D (device-to-device) signal, which is transmitted by a user equipment in a wireless communication system, includes the steps of transmitting D2D control information, and transmitting D2D data corresponding to the D2D control information. In this case, the D2D control information and the D2D data are transmitted in the same subframe and the D2D control information and the D2D data are always adjacent to each other in a frequency axis.

To further achieve these and other advantages and in accordance with the purpose of the present invention, according to a different embodiment, a user equipment transmitting a D2D (device-to-device) signal in a wireless communication system includes a transmitter and a receiver, and a processor, the processor configured to transmit D2D control information, the processor configured to transmit D2D data corresponding to the D2D control information. In this case, the D2D control information and the D2D data are transmitted in the same subframe and the D2D control information and the D2D data are always adjacent to each other in a frequency axis.

A different power offset value can be applied to the D2D control information and the D2D data.

The power offset value can be changed according to a size of a resource allocated to the D2D control information and the D2D data.

The D2D control information can be transmitted with power increased as much as a power offset.

The different power offset value can be transmitted in a manner of being included in the D2D control information.

The D2D control information can be transmitted via one of candidate resources preconfigured in the frequency axis.

Positions of the candidate resources can determine a maximum value of a size of the D2D data.

The D2D control information and the D2D data can be consecutive in the frequency axis.

The D2D control information can include information indicating one of the D2D control information and the D2D data using a higher frequency band.

One of the D2D control information and the D2D data using a higher frequency band can be identified according to a DMRS (demodulation-reference signal) shift value.

The D2D control information is transmitted via two separated resource regions and the D2D data is concatenated with the two separated resource regions in a highest frequency band and a lowest frequency band, respectively.

D2D control information included in the two separated resource regions may consist of the same codeword.

Advantageous Effects

According to the present invention, it is able to dynamically transmit a position of a resource transmitted by a transmitter while latency is minimized.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 5 is a diagram for a configuration of a wireless communication system having multiple antennas;

FIG. 8 is a diagram for an example of a D2D resource pool for performing D2D communication;

FIGS. 10 to 18 are diagrams illustrating various schemes for distinguishing SA transmission from D2D data transmission in a frequency axis;

FIGS. 19 to 23 are diagrams illustrating various schemes for distinguishing SA transmission from D2D data transmission in a time axis;

BEST MODE

Mode for Invention

Figure 1:
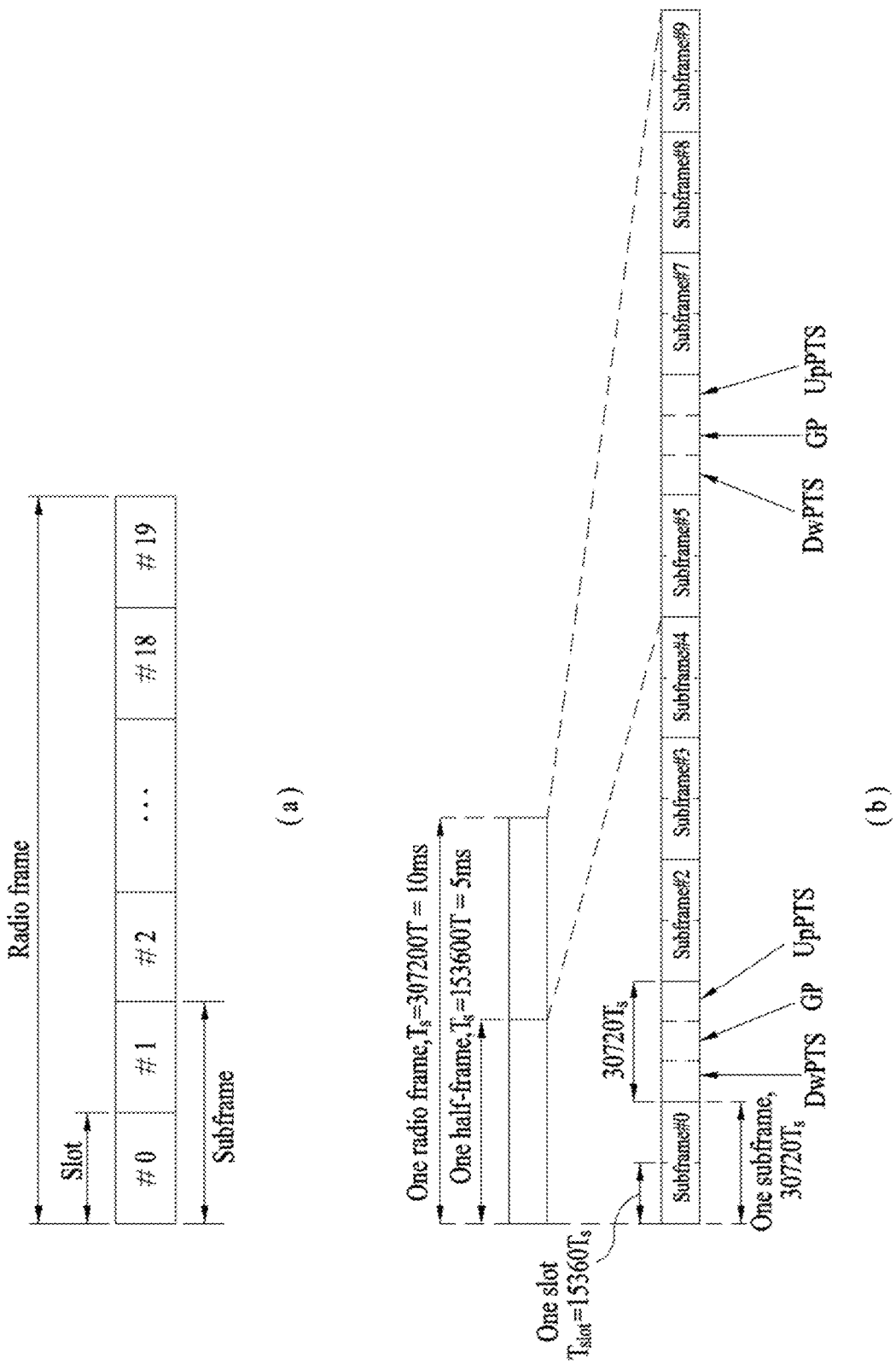
FIG. 1 is a diagram for a structure of a radio frame.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'Relay Node (RN)' or 'Relay Station (RS)'. The term 'terminal' may be replaced with the term 'UE', 'Mobile Station (MS)', 'Mobile Subscriber Station (MSS)', 'Subscriber Station (SS)', etc.

The term "cell", as used herein, may be applied to transmission and reception points such as a base station (eNB), sector, remote radio head (RRH) and relay, and may also be extensively used by a specific transmission/reception point to distinguish between component carriers.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present invention are not limited thereto.

LTE/LTE-A Resource Structure/Channel

With reference to FIG. 1, the structure of a radio frame will be described below.

In a cellular Orthogonal Frequency Division Multiplexing (OFDM) wireless Packet communication system, uplink and/or downlink data Packets are transmitted in subframes. One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of Resource Blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease Inter-Symbol Interference (ISI).

In the case of the normal CP, one subframe includes 14 OFDM symbols because one slot includes 7 OFDM symbols. The first two or three OFDM symbols of each subframe may be allocated to a Physical Downlink Control CHannel (PDCCH) and the other OFDM symbols may be allocated to a Physical Downlink Shared Channel (PDSCH).

FIG. 1(b) illustrates the type-2 radio frame structure. A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
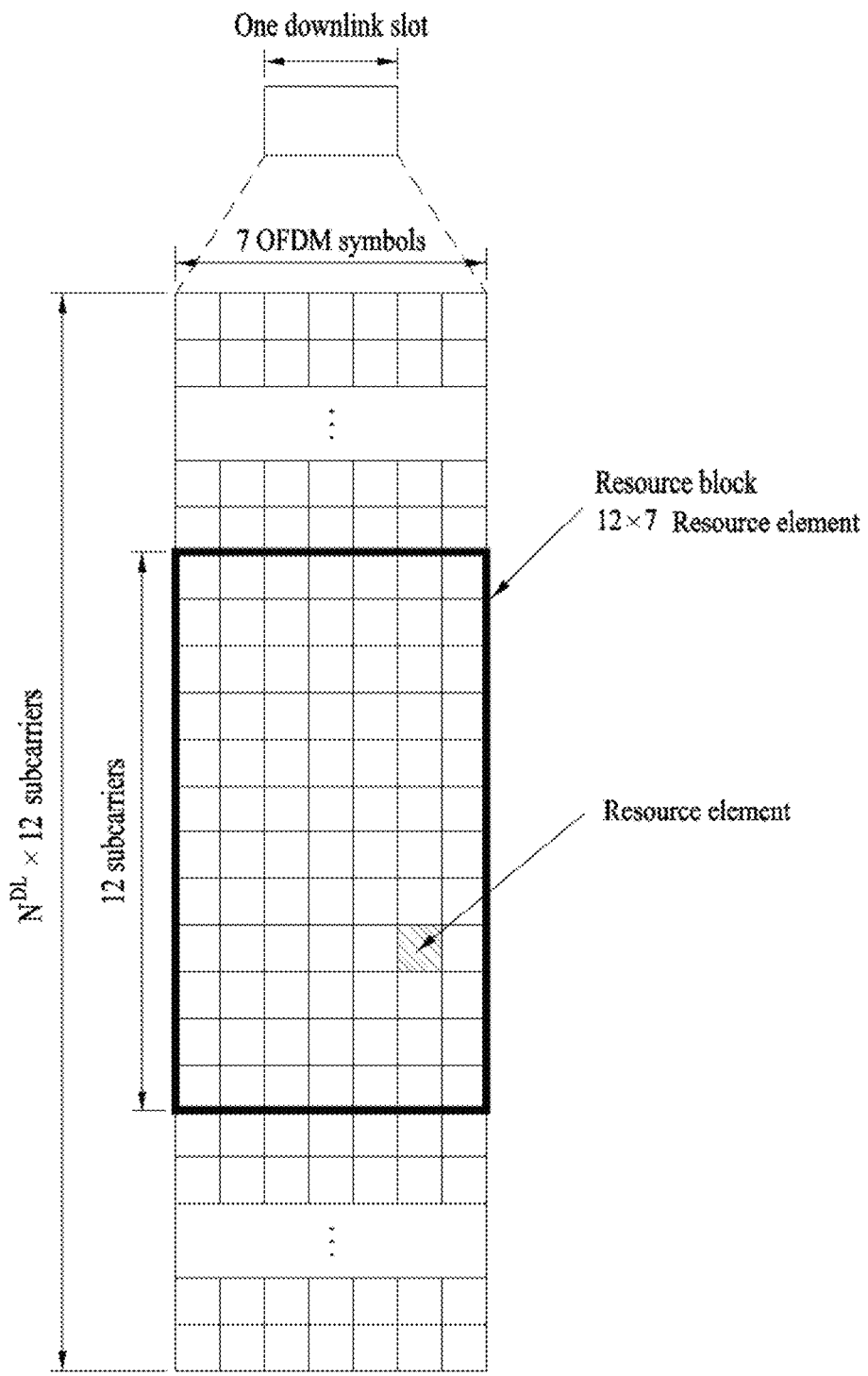
FIG. 2 is a diagram for a resource grid in a downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present invention. For example, a downlink slot may include 7 OFDM symbols in the case of the normal CP, whereas a downlink slot may include 6 OFDM symbols in the case of the extended CP. Each element of the resource grid is referred to as a Resource Element (RE). An RB includes 12×7 REs. The number of RBs in a downlink slot, NDL depends on a downlink transmission bandwidth. An uplink slot may have the same structure as a downlink slot.

Figure 3:
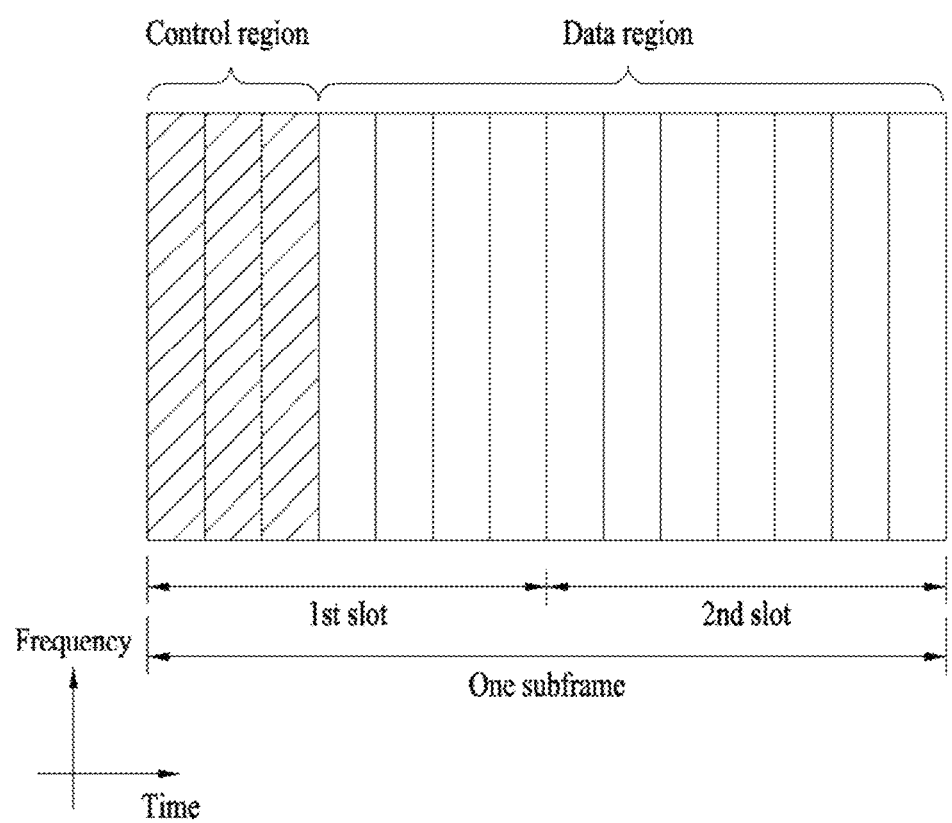
FIG. 3 is a diagram for a structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI transports uplink or downlink scheduling information, or uplink transmission power control commands for UE groups. The PDCCH delivers information about resource allocation and a transport format for a Downlink Shared CHannel (DL-SCH), resource allocation information about an Uplink Shared CHannel (UL-SCH), paging information of a Paging CHannel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
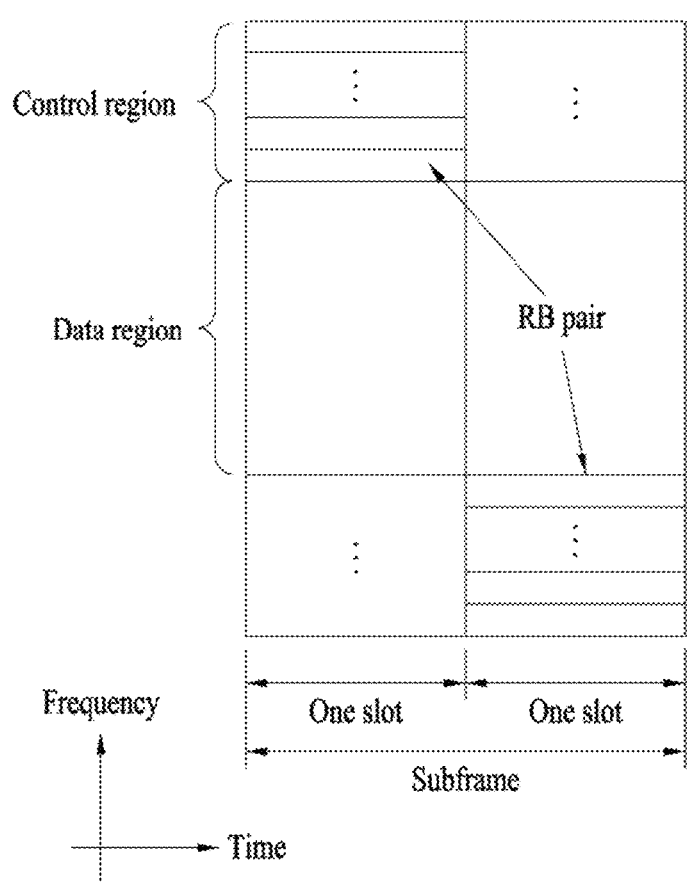
FIG. 4 is a diagram for a structure of an uplink subframe.

FIG. 4 illustrates the structure of an uplink subframe. An uplink subframe may be divided into a control region and a data region in the frequency domain. A Physical Uplink Control CHannel (PUCCH) carrying uplink control information is allocated to the control region and a Physical Uplink Shared Channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signals (RSs)

In a wireless communication system, a Packet is transmitted on a radio channel. In view of the nature of the radio channel, the Packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between Transmission (Tx) antennas and Reception (Rx) antennas is required for successful signal reception. Accordingly, an RS should be transmitted through each Tx antenna.

RSs may be divided into downlink RSs and uplink RSs. In the current LTE system, the uplink RSs include:

i) DeModulation-Reference Signal (DM-RS) used for channel estimation for coherent demodulation of information delivered on a PUSCH and a PUCCH; and ii) Sounding Reference Signal (SRS) used for an eNB or a network to measure the quality of an uplink channel in a different frequency.

The downlink RSs are categorized into:

i) Cell-specific Reference Signal (CRS) shared among all UEs of a cell;

ii) UE-specific RS dedicated to a specific UE;

iii) DM-RS used for coherent demodulation of a PDSCH, when the PDSCH is transmitted;

iv) Channel State Information-Reference Signal (CSI-RS) carrying CSI, when downlink DM-RSs are transmitted;

v) Multimedia Broadcast Single Frequency Network (MBSFN) RS used for coherent demodulation of a signal transmitted in MBSFN mode; and vi) positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

Modeling of MIMO System

FIG. 5 is a diagram illustrating a configuration of a wireless communication system having multiple antennas.

As shown in FIG. 5(a), if the number of transmit antennas is increased to NT and the number of receive antennas is increased to NR, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R)$$ [Equation 1]

For instance, in an MIMO communication system, which uses 4 transmit antennas and 4 receive antennas, a transmission rate 4 times higher than that of a single antenna system can be obtained. Since this theoretical capacity increase of the MIMO system has been proved in the middle of 90's, many ongoing efforts are made to various techniques to substantially improve a data transmission rate. In addition, these techniques are already adopted in part as standards for various wireless communications such as 3G mobile communication, next generation wireless LAN and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. It is assumed that there are NT transmit antennas and NR receive antennas.

Regarding a transmitted signal, if there are NT transmit antennas, the maximum number of pieces of information that can be transmitted is NT. Hence, the transmission information can be represented as shown in Equation 2.

$$s = [s_1, s_2, \ldots, s_{N_T}]^T$$ [Equation 2]

Meanwhile, transmit powers can be set different from each other for individual pieces of transmission information $s_1, s_2, \ldots s_{N_T}$, respectively. If the transmit powers are set to $P_1, P_2, \ldots, P_{N_T}$, respectively, the transmission information with adjusted transmit powers can be represented as Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T$$ [Equation 3]

In addition, $\hat{S}$ can be represented as Equation 4 using diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps$$ [Equation 4]

Assuming a case of configuring NT transmitted signals $x_1, x_2, \ldots, x_{N_T}$, which are actually transmitted, by applying weight matrix W to the information vector S having the adjusted transmit powers, the weight matrix W serves to appropriately distribute the transmission information to each antenna according to a transport channel state. $x_1, x_2, \ldots, x_{N_T}$ can be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

In Equation 5, $w_{ij}$ denotes a weight between an $i^{th}$ transmit antenna and $j^{th}$ information. W is also called a precoding matrix.

If the NR receive antennas are present, respective received signals $y_1, y_2, \ldots, y_{N_R}$ of the antennas can be expressed as follows.

$$y = [y_1, y_2, \ldots, y_{N_R}]^T \quad \text{[Equation 6]}$$

If channels are modeled in the MIMO wireless communication system, the channels may be distinguished according to transmit/receive antenna indexes. A channel from the transmit antenna j to the receive antenna i is denoted by $h_{ij}$. In $h_{ij}$, it is noted that the indexes of the receive antennas precede the indexes of the transmit antennas in view of the order of indexes.

FIG. 5(b) is a diagram illustrating channels from the NT transmit antennas to the receive antenna i. The channels may be combined and expressed in the form of a vector and a matrix. In FIG. 5(b), the channels from the NT transmit antennas to the receive antenna i can be expressed as follows.

$$h_i^T = [h_{i1}, h_{i2}, \ldots, h_{iN_T}] \quad \text{[Equation 7]}$$

Accordingly, all channels from the NT transmit antennas to the NR receive antennas can be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_1} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \quad \text{[Equation 8]}$$

An AWGN (Additive White Gaussian Noise) is added to the actual channels after a channel matrix H. The AWGN respectively added to the NR receive antennas can be expressed as follows.

$$n = [n_1, n_2, \ldots, n_{N_R}]^T \quad \text{[Equation 9]}$$

Through the above-described mathematical modeling, the received signals can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = Hx + n \quad \text{[Equation 10]}$$

Meanwhile, the number of rows and columns of the channel matrix H indicating the channel state is determined by the number of transmit and receive antennas. The number of rows of the channel matrix H is equal to the number NR of receive antennas and the number of columns thereof is equal to the number NR of transmit antennas. That is, the channel matrix H is an NR×NT matrix.

The rank of the matrix is defined by the smaller of the number of rows and the number of columns, which are independent from each other. Accordingly, the rank of the matrix is not greater than the number of rows or columns. The rank rank(H) of the channel matrix H is restricted as follows.

$$\text{rank}(H) \leq \min(N_T, N_R) \quad \text{[Equation 11]}$$

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

In the description of the present document, 'rank' for MIMO transmission indicates the number of paths capable of sending signals independently on specific time and frequency resources and 'number of layers' indicates the number of signal streams transmitted through the respective paths. Generally, since a transmitting end transmits the number of layers corresponding to the rank number, one rank has the same meaning of the layer number unless mentioned specially.

Synchronization Acquisition of D2D UE

Now, a description will be given of synchronization acquisition between UEs in D2D communication based on the foregoing description in the context of the legacy LTE/LTE-A system. In an OFDM system, if time/frequency synchronization is not acquired, the resulting Inter-Cell Interference (ICI) may make it impossible to multiplex different UEs in an OFDM signal. If each individual D2D UE acquires synchronization by transmitting and receiving a synchronization signal directly, this is inefficient. In a distributed node system such as a D2D communication system, therefore, a specific node may transmit a representative synchronization signal and the other UEs may acquire synchronization using the representative synchronization signal. In other words, some nodes (which may be an eNB, a UE, and a Synchronization Reference Node (SRN, also referred to as a synchronization source)) may transmit a D2D Synchronization Signal (D2DSS) and the remaining UEs may transmit and receive signals in synchronization with the D2DSS.

Figure 6:
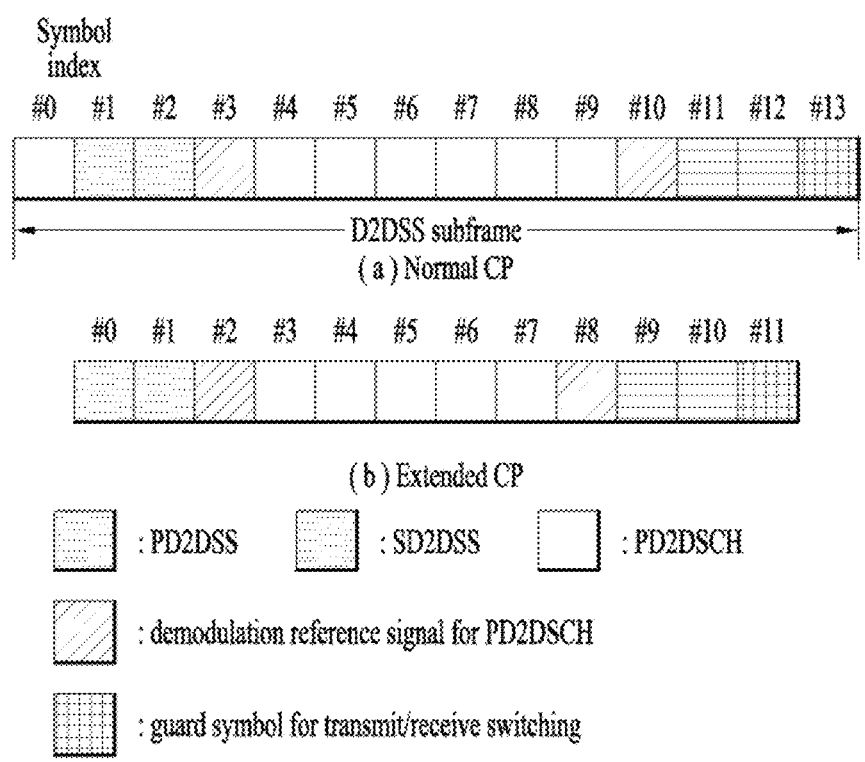
FIG. 6 is a diagram for a subframe in which a D2D synchronization signal is transmitted.

D2DSSs may include a Primary D2DSS (PD2DSS) or a Primary Sidelink Synchronization Signal (PSSS) and a Secondary D2DSS (SD2DSS) or a Secondary Sidelink Synchronization Signal (SSSS). The PD2DSS may be configured to have a similar/modified/repeated structure of a Zadoff-chu sequence of a predetermined length or a Primary Synchronization Signal (PSS). Unlike a DL PSS, the PD2DSS may use a different Zadoff-chu root index (e.g., 26, 37). And, the SD2DSS may be configured to have a similar/modified/repeated structure of an M-sequence or a Secondary Synchronization Signal (SSS). If UEs synchronize their timing with an eNB, the eNB serves as an SRN and the D2DSS is a PSS/SSS. Unlike PSS/SSS of DL, the PD2DSS/SD2DSS follows UL subcarrier mapping scheme. FIG. 6 shows a subframe in which a D2D synchronization signal is transmitted. A Physical D2D Synchronization Channel (PD2DSCH) may be a (broadcast) channel carrying basic (system) information that a UE should first obtain before D2D signal transmission and reception (e.g., D2DSS-related information, a Duplex Mode (DM), a TDD UL/DL configuration, a resource pool-related information, the type of an application related to the D2DSS, etc.). The PD2DSCH may be transmitted in the same subframe as the D2DSS or in a subframe subsequent to the frame carrying the D2DSS. A DMRS can be used to demodulate the PD2DSCH.

The SRN may be a node that transmits a D2DSS and a PD2DSCH. The D2DSS may be a specific sequence and the PD2DSCH may be a sequence representing specific information or a codeword produced by predetermined channel coding. The SRN may be an eNB or a specific D2D UE. In the case of partial network coverage or out of network coverage, the SRN may be a UE.

Figure 7:
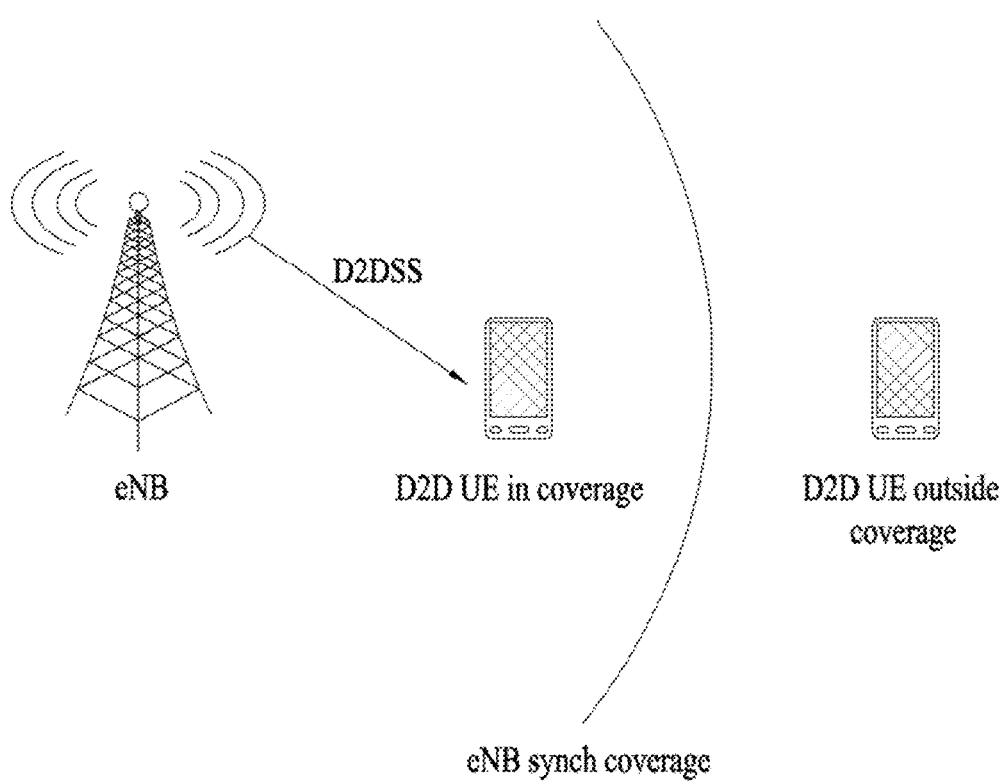
FIG. 7 is a diagram for explaining relay of a D2D signal.

In a situation illustrated in FIG. 7, a D2DSS may be relayed for D2D communication with an out-of-coverage UE. The D2DSS may be relayed over multiple hops. The following description is given with the appreciation that relay of an SS covers transmission of a D2DSS in a separate format according to a SS reception time as well as direct Amplify-and-Forward (AF)-relay of an SS transmitted by an eNB. As the D2DSS is relayed, an in-coverage UE may communicate directly with an out-of-coverage UE.

D2D Resource Pool

FIG. 8 shows an example of a UE1, a UE2 and a resource pool used by the UE1 and the UE2 performing D2D communication. In FIG. 8 (a), a UE corresponds to a terminal or such a network device as an eNB transmitting and receiving a signal according to a D2D communication scheme. A UE selects a resource unit corresponding to a specific resource from a resource pool corresponding to a set of resources and the UE transmits a D2D signal using the selected resource unit. A UE2 corresponding to a reception UE receives a configuration of a resource pool in which the UE1 is able to transmit a signal and detects a signal of the UE1 in the resource pool. In this case, if the UE1 is located at the inside of coverage of an eNB, the eNB can inform the UE1 of the resource pool. If the UE1 is located at the outside of coverage of the eNB, the resource pool can be informed by a different UE or can be determined by a predetermined resource. In general, a resource pool includes a plurality of resource units. A UE selects one or more resource units from among a plurality of the resource units and may be able to use the selected resource unit(s) for D2D signal transmission. FIG. 8 (b) shows an example of configuring a resource unit. Referring to FIG. 8 (b), the entire frequency resources are divided into the $N_F$ number of resource units and the entire time resources are divided into the $N_T$ number of resource units. In particular, it is able to define $N_F*N_T$ number of resource units in total. In particular, a resource pool can be repeated with a period of $N_T$ subframes. Specifically, as shown in FIG. 8, one resource unit may periodically and repeatedly appear. Or, an index of a physical resource unit to which a logical resource unit is mapped may change with a predetermined pattern according to time to obtain a diversity gain in time domain and/or frequency domain. In this resource unit structure, a resource pool may correspond to a set of resource units capable of being used by a UE intending to transmit a D2D signal.

A resource pool can be classified into various types. First of all, the resource pool can be classified according to contents of a D2D signal transmitted via each resource pool. For example, the contents of the D2D signal can be classified into various signals and a separate resource pool can be configured according to each of the contents. The contents of the D2D signal may include SA (scheduling assignment), a D2D data channel, and a discovery channel. The SA may correspond to a signal including information on a resource position of a D2D data channel, information on MCS (modulation and coding scheme) necessary for modulating and demodulating a data channel, information on a MIMO transmission scheme, information on TA (timing advance), and the like. The SA signal can be transmitted on an identical resource unit in a manner of being multiplexed with D2D data. In this case, an SA resource pool may correspond to a pool of resources that an SA and D2D data are transmitted in a manner of being multiplexed. The SA signal can also be referred to as a D2D control channel or a PSCCH (physical sidelink control channel). The D2D data channel (or, PSSCH (physical sidelink shared channel)) corresponds to a resource pool used by a transmission UE to transmit user data. If an SA and a D2D data are transmitted in a manner of being multiplexed in an identical resource unit, D2D data channel except SA information can be transmitted only in a resource pool for the D2D data channel. In other word, resource elements (REs), which are used to transmit SA information in a specific resource unit of an SA resource pool, can also be used for transmitting D2D data in a D2D data channel resource pool. The discovery channel may correspond to a resource pool for a message that enables a neighboring UE to discover transmission UE transmitting information such as ID of the UE, and the like.

Although contents of D2D signal are identical to each other, it may use a different resource pool according to a transmission/reception attribute of the D2D signal. For example, in case of the same D2D data channel or the same discovery message, the D2D data channel or the discovery signal can be classified into a different resource pool according to a transmission timing determination scheme (e.g., whether a D2D signal is transmitted at the time of receiving a synchronization reference signal or the timing to which a prescribed timing advance is added) of a D2D signal, a resource allocation scheme (e.g., whether a transmission resource of an individual signal is designated by an eNB or an individual transmission UE selects an individual signal transmission resource from a pool), a signal format (e.g., number of symbols occupied by a D2D signal in a subframe, number of subframes used for transmitting a D2D signal), signal strength from an eNB, strength of transmit power of a D2D UE, and the like. For clarity, a method for an eNB to directly designate a transmission resource of a D2D transmission UE is referred to as a mode 1. If a transmission resource region is configured in advance or an eNB designates the transmission resource region and a UE directly selects a transmission resource from the transmission resource region, it is referred to as a mode 2. In case of performing D2D discovery, if an eNB directly indicates a resource, it is referred to as a type 2. If a UE directly selects a transmission resource from a predetermined resource region or a resource region indicated by the eNB, it is referred to as a type 1.

Transmission and Reception of SA

A mode 1 UE can transmit an SA signal (or, a D2D control signal, SCI (sidelink control information)) via a resource configured by an eNB. A mode 2 UE receives a configured resource to be used for D2D transmission. The mode 2 UE can transmit SA by selecting a time frequency resource from the configured resource.

Figure 9:
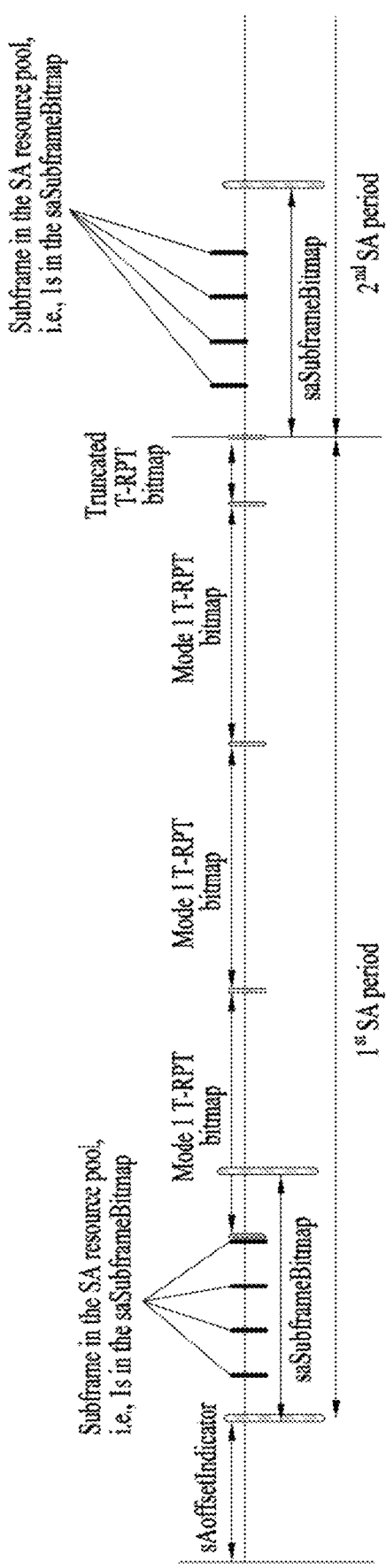
FIG. 9 is a diagram for explaining an SA period.

The SA period can be defined as FIG. 9. Referring to FIG. 9, a first SA period can start at a subframe apart from a specific system frame as much as a prescribed offset (SAOffsetIndicator) indicated by higher layer signaling. Each SA period can include an SA resource pool and a subframe pool for transmitting D2D data. The SA resource pool can include subframes ranging from a first subframe of an SA period to the last subframe among subframes indicated by a subframe bitmap (saSubframeBitmap) to transmit SA. In case of mode 1, T-RPT (time-resource pattern for transmission) is applied to the resource pool for transmitting D2D data to determine a subframe in which an actual data is transmitted. As shown in the drawing, if the number of subframes included in an SA period except the SA resource pool is greater than the number of T-RPT bits, the T-RPT can be repeatedly applied and the lastly applied T-RPT can be applied in a manner of being truncated as many as the number of remaining subframes. A transmission UE performs transmission at a position where a T-RPT bitmap corresponds to 1 in an indicated T-RPT and 4 transmissions are performed in a MAC PDU.

In the following, methods for a transmitter to dynamically indicate a position of a resource transmitting a signal in device-to-device (D2D) communication, vehicle-to-vehicle (V2V) communication, or vehicle-to-something communication are explained based on the aforementioned description. In case of performing such a service as V2X and V2V, it may more strictly apply a delay constraint compared to a cellular communication or D2D communication. And, it may be necessary to change transmission-related parameters such as a transmission resource, resource allocation, MCS, and the like between SA periods. Hence, it may be difficult to apply a data transmission scheme according to legacy SA transmission and T-RPT as it is. For example, when SA and data are transmitted according to the legacy scheme, if it fails to receive the SA, it may be difficult to receive a data packet thereafter. And, although a packet is generated in the middle of an SA period, since it is unable to immediately transmit a data packet, delay can be increased as much as a corresponding period. In the following, in order to solve the problem above, methods of more dynamically transmitting a D2D control signal (SA) and D2D data are explained. In the following description, SA (scheduling assignment) or D2D control information corresponds to a common name of a signal that transmits various control information necessary for transmitting D2D data information. The SA (scheduling assignment) or the D2D control information includes all or a part of a subframe pattern (e.g., T-RPT), frequency resource allocation, MCS transmit power, RV (redundancy version), RV cycling type (information indicating whether RV is fixed or modifiable), transmission count per MAC PDU, and NDI. Each SA transmission may transmit different control information. In the following, a scheme for distinguishing SA transmission from D2D data transmission in a frequency axis is explained first and a scheme for distinguishing SA transmission from D2D data transmission in a time axis is explained later for clarity. It does not mean that one scheme completely excludes another scheme. In particular, when SA transmission is distinguished from D2D data transmission in a frequency axis, TDM can be performed on SA and D2D data.

Figure 10:
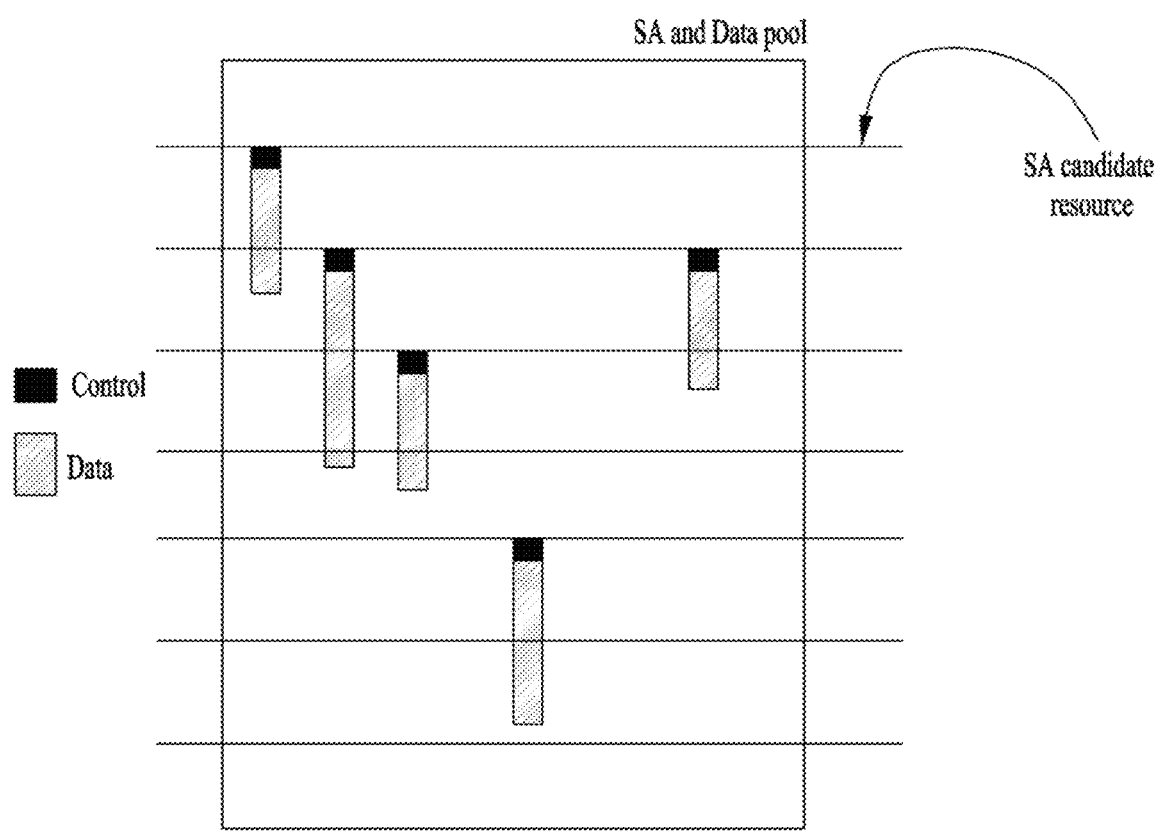
Figure 11:
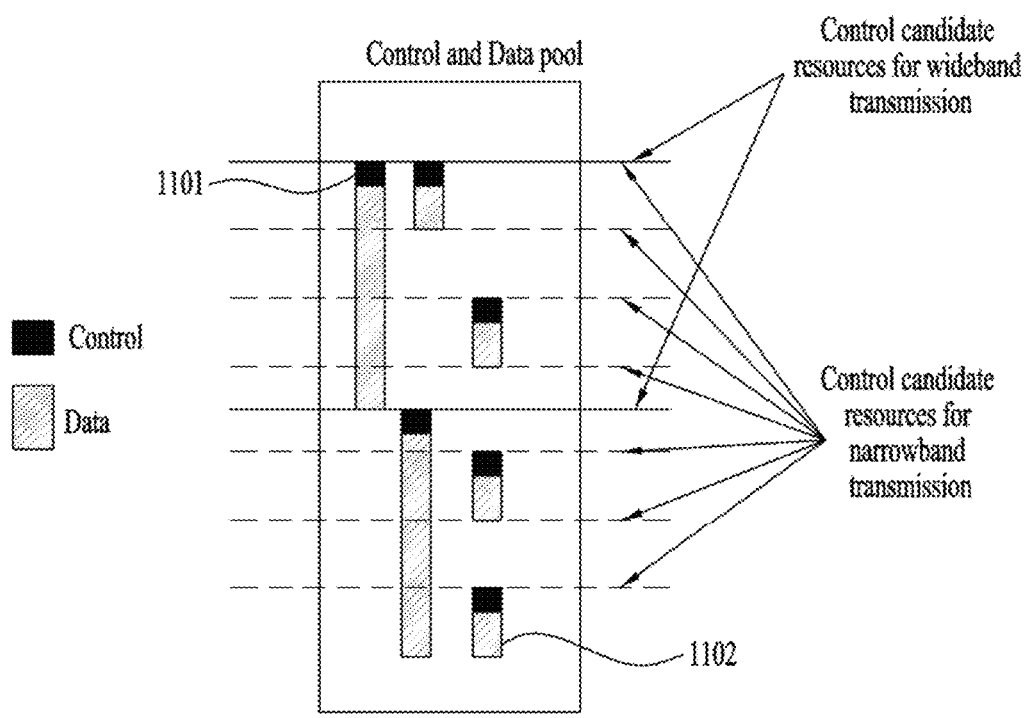
Figure 12:
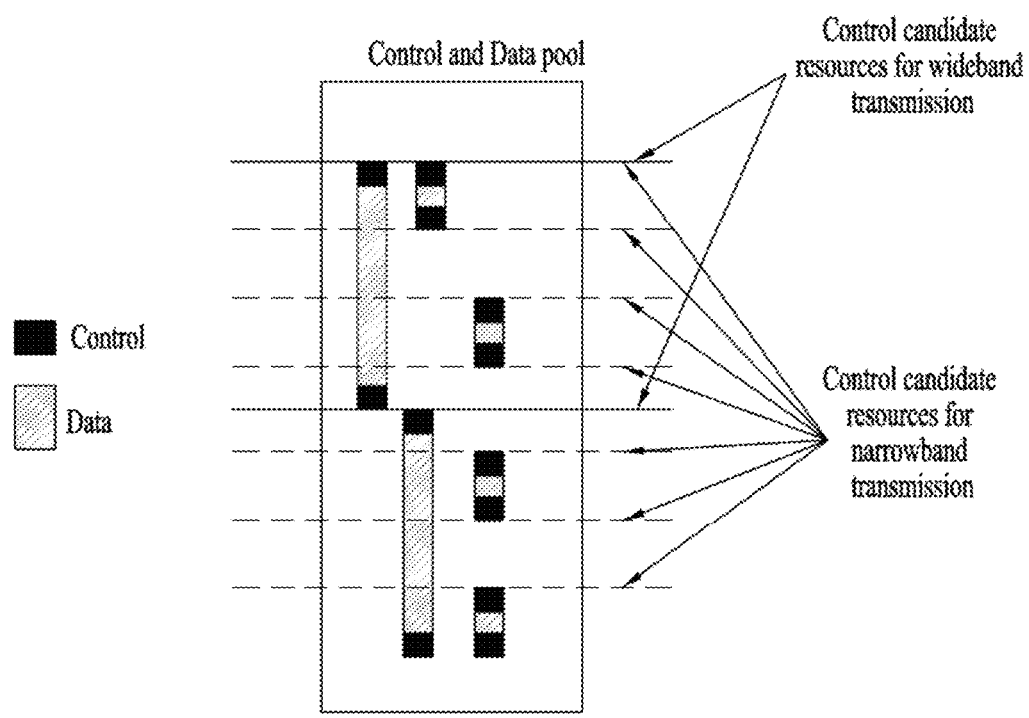

Scheme of Distinguishing SA Transmission from D2D Data Transmission in Frequency Axis It may distinctively transmit control information in frequency domain and data can be transmitted after (or prior to) the control information in a manner of being concatenated with the control information. A UE transmits D2D control information and can transmit D2D data corresponding to the D2D control information. In this case, the D2D control information and the D2D data are transmitted in the same subframe and the D2D control information and the D2D data can be always adjacent to each other. If the D2D control information and the D2D data are adjacent to each other, it means that the D2D control information and the D2D data are consecutive in a frequency axis. Examples of transmitting the D2D control information and the D2D data are shown in FIGS. 10 to 12. For details of FIGS. 10 to 12 are described later.

Subsequently, if SA and data are transmitted in the same subframe in a manner of being FDM, it may apply an offset to power of the SA and power of the data. A power offset value applied to the SA and the data can be differently configured for a case of performing TDM on the SA and the data and a case of performing FDM on the SA and the data, respectively. Or, when TDM is performed on the SA and the data, it may not apply a separate offset (offset value 0).

In particular, it may apply a power offset value to each of the D2D control information and the D2D data. And, a different power offset value can be applied to the D2D control information and the D2D data. If the same power offset or the same PSD (power spectral density) is applied to the D2D control information and the D2D data, such a problem that coverage of the D2D control information becomes smaller than coverage of the D2D data may occur. For example, referring to FIG. 13 (b), it is able to see that SNR of PSCCH is lower than SNR of PSSCH in the same BLER. Hence, the problem can be solved by applying a different power offset to the D2D control information and the D2D data. Specifically, if the D2D control information is transmitted using power increased as much as power offset, it may expand the coverage of the D2D control information. By doing so, a coverage mismatch problem between the D2D control information and the D2D data can be solved.

Moreover, the power offset value may vary depending on a size of a resource allocated to the D2D control information and the D2D data. For example, if a size of a data resource is big, it may configure the power offset value to be big. In particular, if the size of the data resource increases, it may be able to obtain an effect of widening the coverage of the data due to the increased coding gain. In this case, it may assign higher transmit power to a control signal. However, if the size of the data resource exceeds a specific threshold, it is unable to satisfy a minimum PSD level required by a reception UE. Hence, if the size of the data resource is simply configured in proportion to the power offset value, a problem may occur. Hence, it is unable to configure a relation between the size of the data resource and the size of the transmit power offset with a proportional relation or an inverse proportional relation. Hence, it is necessary to determine the offset size to have a higher SNR in a BLER level requiring BLER performance of a control signal by anticipating link performance according to the data resource size and comparing BLER performance of the data with BLER performance of the power offset. Referring to FIG. 13, it is able to check that BLER is different according to a message size (and/or retransmission number). (FIG. 13 is a graph illustrating BLER performance for 190-byte SA (10 RBs), 300-byte SA (10 RBs), and 40-bit SA (1RB). HARQ combining assumes combining of 2 transmissions and single transmission corresponds to BLER for single transmission). Hence, when a message of a size of 190 bytes is transmitted and a message of a size of 300 bytes is transmitted, a power offset value for SA and a power offset value for data can be differently configured.

The power offset can be indicated by a network or can be determined by a UE. In general, a signal can be smoothly transmitted and received when an error rate of a control channel is lower than an error rate of a data channel. The error rates of the control channel and the data channel can be determined based on an RB size of the data channel, a message size, MCS, moving speed of a UE, a retransmission number, target QoS, and the like.

Meanwhile, although the power offset is indicated in a form of an offset between a data signal and a control signal, the power offset can also be signaled in a form of a ratio of power to be assigned to the control signal (or the data signal). For example, the power offset can be signaled in a manner that X % of the total transmit power is assigned to the control signal.

Meanwhile, if a size of the power offset is determined according to a size of a data resource, it may indicate that power is allocated according to an RB or power is allocated to a channel of a control signal and a channel of a data signal. The former case is applied when power allocation means a power size allocated according to an RB. The latter case is applied when power allocation means a power size allocated according to a signal type.

If power amount allocated to a data signal corresponds to the remaining power amount from which power amount applied to a control signal is excluded, naturally, a size of a power offset may change according to a size of a data resource. For example, assume that there is power as much as 100. In this case, assume that power as much as 30 is allocated to a control signal and power as much as 70 is allocated to a data signal. If a size of the data signal corresponds to 1 RB, the power as much as 70 is applied to the 1 BR of the data signal. If the size of the data signal corresponds to 7 RBs, power as much as 10 is applied to each of the 7 RBs. An embodiment of naturally changing a size of an offset according to a size of a data resource has been explained in terms of a power offset (or a control signal and a data signal) according to an RB.

When a network assigns a data channel to a UE, the network can signal a power offset value interlocked with a resource allocation size (RB size) to the UE. The power offset value can be transmitted in a manner of being included in D2D control information. In particular, a power offset value of SA and a power offset value of data can be transmitted in a manner of being included in the SA to make a reception UE refer to the power offset values in decoding a measured data.

Or, the UE may determine a power offset value. In this case, the UE can determine the power offset value according to moving speed of the UE. Or, when the UE autonomously configures a transmission resource, the UE can autonomously determine a power offset value of SA and a power offset value of data. Although the power offset values of the control signal and the data signal can be transmitted in a manner of being explicitly included in the control signal, a value of transmit power applied to the control signal or the data signal can be transmitted in a manner of being directly included in the control signal. Specifically, transmit power of the control signal and transmit power of the data signal, transmit power of the control signal and a power offset between the control signal and the data signal, or transmit power of the data signal and an offset value between the data signal and the control signal can be transmitted in a manner of being included in the control signal. For example, if power of A dBm is applied to the control signal and power of B dBm is applied to the data signal, values of the power can be transmitted in a manner of being explicitly included in the control signal. By doing so, a reception UE is able to know sizes of the power applied to the control signal and the data signal and a size of an offset (power difference between the data signal and the control signal). Hence, the reception UE can utilize the values for measuring strength of a signal and a pathloss. For example, if a UE measures an RS of a control signal and knows a size of transmit power of the control signal, the UE is able to calculate a pathloss of the arrived control signal. And, the UE is able to calculate a pathloss of a data signal as well. Since the UE knows a difference between transmit power of the control signal and transmit power of the data signal and a size of the difference, the UE can measure either the pathloss of the control signal or the pathloss of the data signal only. If the pathloss of the control signal and the pathloss of the data signal are measured and all of the pathloss are utilized, it may be able to measure a more precise pathloss.

Meanwhile, whether or not FDM is performed on SA and data can be differently configured according to speed of a UE, target coverage of the SA and the data, retransmission numbers of the SA and the data, BLER, MCS, a message size/type, an RB size, and the like. For example, in order for a UE to support relative speed 500 km/h, it is necessary to expand target coverage to about 600 m. In case of transmitting SA of 1 RB with 23 dBm to achieve the coverage, it may have reception SNR as much as 10 dB. In this case, if data of 9 RBs and SA are transmitted using the FDM scheme and PSD of the data and PSD of the SA are configured to be the same, SNR of the SA becomes 0 dB. In particular, referring to a BLER curve of single transmission shown in FIG. 13, it is able to see that about 30% of errors occur. Hence, in this case, it may be preferable to transmit the SA by performing TDM on the SA to secure coverage. When the SA is transmitted, in order to prevent from failing to receive data, retransmission of the SA can be supported. A network can determine whether to perform TDM on the SA and the data according to a resource pool. Or, a UE can determine whether to perform TDM/FDM on the SA and the data according to moving speed of the UE, a message size, and a message type. Or, the network can signal an SA/data transmission technique, a power offset, and the like capable of being used according to a situation of a UE to the UE according to a situation. For example, when TDM is performed on the SA and the data, all or a part of a power value according to a channel, a power offset value between channels, and a ratio of a power value assigned to a control signal among the total power can be signaled to the UE or can be determined in advance.

When D2D control information and D2D data adjacent to each other are transmitted on a frequency axis, the D2D control information can be transmitted via one of candidate resources configured in advance on the frequency axis. In particular, as shown in FIG. 10, when SA and data adjacent to each other are transmitted, the SA can be transmitted using an SA candidate resource on the frequency axis. In this case, a position of the candidate resource can be configured in advance or can be configured by a network. Or, as mentioned in the following, frequency domain resource allocation information can be indicated using a DMRS. If a position of a candidate resource is determined in advance, control information can include size information of an RA only, thereby reducing signaling overhead.

In this case, an RB size capable of maximally transmitting data may change according to a position at which the SA is transmitted. In particular, a maximum value of a D2D data size can be determined according to a position of a candidate resource. (It can also be comprehended as a BW on which data is transmitted is implicitly indicated according to a position of SA in a subframe in which the SA is transmitted.) Referring to FIG. 11, if SA uses a candidate resource 1101, data can be transmitted in a wide band. Yet, if SA uses a candidate resource 1102, data can be transmitted in a narrow band only. Specifically, if SA is transmitted in a $40^{th}$ RB in a system of 50 RBs, data can be transmitted with maximum 10 RBs only. A scheme of mapping SA to a lower RB index of a transmission band is to set a limit on a size capable of transmitting data. Hence, in order to perform wideband transmission, SA can be deployed at the last RB of a transmission band. In this case, a UE receiving data firstly performs blind decoding on the SA. The UE indicates whether the data is deployed at the top of the SA or the bottom of the SA (whether the data is located at an RB index higher than a position of the SA or an RB index lower than the position of the SA) by configuring SA contents or a DMRS sequence/OCC/CS. For example, the D2D control information can include information indicating either the D2D control information or the D2D data that uses a high frequency band. If the data is deployed at the bottom of the SA, DMRS CS 0 is used. If the data is deployed at the top of the SA, DMRS CS 6 is used. And, a position of an SA capable of being transmitted using a narrow band and a position of an SA capable of being transmitted using a wide band can be differently configured in advance.

Meanwhile, the SA can be deployed in a form of surrounding the data in frequency domain. In particular, the D2D control information is transmitted via 2 separated resource regions and the D2D data can be concatenated with the 2 separated resource regions in a highest frequency band and a lowest frequency band, respectively. FIG. 12 shows the example. According to the scheme above, since it is able to protect data from a signal of a different UE, it may have relatively less interference in in-band emission. Meanwhile, in the aspect that in-band emission is less generated, the data can be deployed in a form of surrounding the SA. In particular, control information is transmitted via a single resource region and data is transmitted in a form of surrounding a control signal. According to the scheme mentioned above, it may be able to obtain an additional effect of protecting a control signal form a different UE.

And, the D2D control information included in the 2 separate resource regions can be configured by the same codeword. When the SA is deployed at the frequency domain, if the completely same codeword is deployed to be repeated in the frequency domain, it may be able to relatively reduce the increase of PARR. In this case, although it is able to transmit the SA in all subframes, as mentioned earlier in the proposed method, it may not transmit the SA in a partial subframe. In this case, rate matching or puncturing can be performed on a region where the SA is used to be transmitted. As mentioned in the following, a position of data where the SA is not transmitted together can be indicated via a DMRS or a previously transmitted SA. As mentioned in the foregoing description, a candidate resource can also be used for the method described in FIG. 12.

Meanwhile, D2D control information and D2D data can be transmitted using single DFT spreading. In this case, a method of indicating RA information using a DMRS sequence described in the following can be used at the same time. When a UE is equipped with multiple transmission antennas, although a separate DFT spreading is applied, if the control information and the data are transmitted via a different antenna, since multi cluster transmission is not necessary, PARR is not additionally increased. In this case, since the control information is more important, it may be able to determine a rule that the control information is transmitted from a first antenna port. This is because, when a UE is implemented, it is highly probable to install an amplifier of better performance in the first antenna port. The present invention is not restricted to a specific antenna port only. When a DMRS sequence is generated and an amplifier of better performance is used to transmit and receive an important signal, a port number is fixed in advance to enable a reception UE to perform decoding by assuming a specific antenna port.

When SA is transmitted in a manner of being adjacent to data, control information indicates not only control information on data of a corresponding subframe but also control information on the N number of subframes appearing after the subframe. For example, T-RPT information can be included in the control information. The control information may indicate positions at which the N numbers of subframes are transmitted. (In this case, the T-RPT corresponds to a scheme of indicating a positon of a time resource in which a data signal is transmitted. It is not mandatory that the T-RPT is signaled in a form of a bitmap. A position of a time resource in which a data resource is transmitted can be represented to a position of a time resource in which SA is transmitted in a form of an offset. In this case, all data signals can be represented in the time resource in which the SA is transmitted in a form of an offset. In this case, each of the data signals can be sequentially represented in an offset form for a previous data (in case of a first data, an offset from a time resource in which the SA is transmitted)). In this case, since a reception UE is able to anticipate timing at which data is to be transmitted in a following subframe, a decoding success rate can be increased. On the other hand, since a different UE is able to anticipate a position at which data is to be transmitted in a following subframe, it may be able to avoid a corresponding resource.

In the scheme mentioned above, although it is able to always transmit data and SA in the same subframe, the SA can be transmitted in a partial subframe only. In this case, the data can perform rate matching or puncturing on a region at which the SA is transmitted. In particular, MCS can be determined by assuming a case that there is no SA. Or, it may be able to determine MCS of data by assuming a case that there is SA. If SA is not transmitted, it may be able to fill an RE in which the SA is transmitted by performing rate matching or additionally transmitting codeword bits. Or, a corresponding RB is emptied out to use the RB as a guard. Specifically, when control information and data occupy x, x+1, . . . , x+k RB, SA can be assigned to x, . . . ,x+a and data can be assigned to x+a+1, . . . ,x+k. In this case, in case of transmitting the data only, the data can be assigned to all of x, . . . , x+k RB or x+a+1, . . . , x+k only. The former case corresponds to a case of performing rate matching or puncturing by assuming that the data is assigned to x, . . . ,x+k. The latter case corresponds to a case that the data is assigned to x+a+1, . . . , x+k.

A pool in which SA is transmitted can be distinguished from a pool in which data is transmitted on a frequency axis. Control information indicated by the SA can indicate control information on data of a subframe in which the SA is transmitted or control information on the N number of subframes including the data of the subframe in which the SA is transmitted. (In this case, the N may correspond to a predetermined value or a value signaled by a network.)

Figure 14:
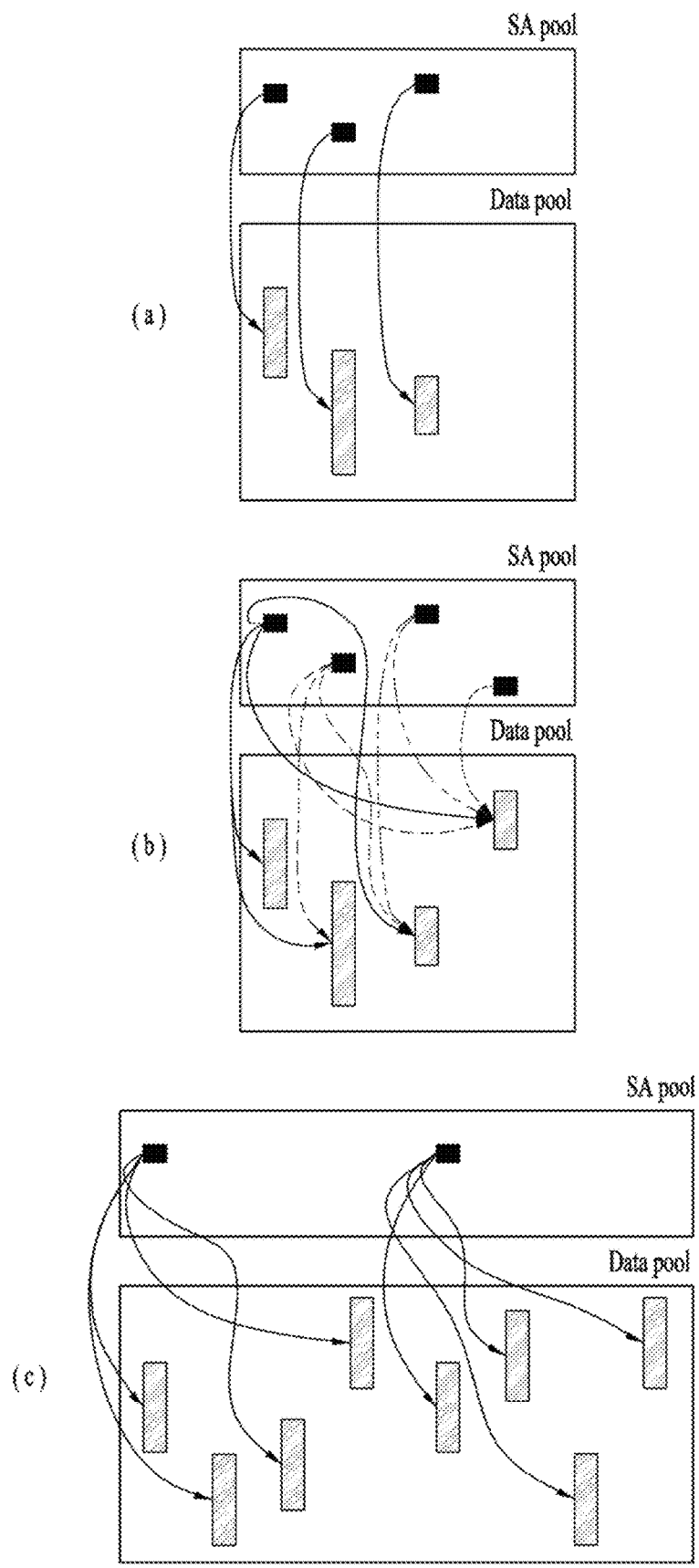

FIG. 14 illustrates various examples of the abovementioned scheme. Specifically, FIG. 14 (*a*) illustrates a case that a pool of SA and a pool of data are distinguished from each other on a frequency axis and the SA and the data related to the SA are transmitted in the same subframe. FIG. 14 (*b*) illustrates a case that the SA indicates not only a data of the subframe in which the SA is transmitted but also a data position of a following subframe. In this case, if information such as T-RPT is transmitted together, since a different UE is able to identify T-RPT of a corresponding UE, the different UE is able to select a resource by avoiding a corresponding resource at the time of selecting a resource from following time/frequency resources. FIG. 14 (c) illustrates a case that SA is transmitted in every new MAC PDU or every predetermined subframe interval instead of a case of transmitting SA in every data transmission.

Figure 15:
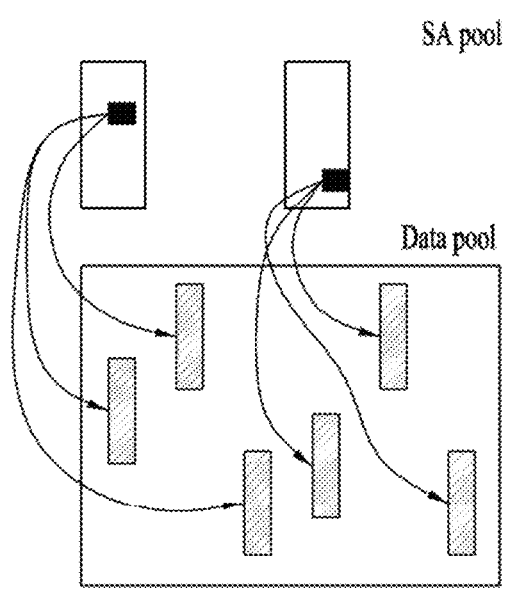

FIG. 15 shows a different example. A difference between FIG. 14c and FIG. 15 is in that SA is transmitted to a partial time region only rather than the entire time region. As shown in FIG. 15, when RSSI is measured in a state that an SA resource pool is separated from a data pool, either RSSI of the data pool or RSSI of the SA pool can be measured only. According to the scheme of FIG. 15, since control information is not transmitted in every subframe, it is able to increase efficiency of data transmission. And, according to the scheme of FIG. 15, it may perform rate matching or puncturing on a data region in a subframe in which control information is transmitted in consideration of an RE transmitting the control information. A reception UE may attempt to decode the SA pool only. Hence, it is able to reduce battery consumption of the reception UE compared to a scheme of attempting to decode in every subframe.

As shown in FIGS. 14 and 15, if control information of various data transmissions is transmitted in one SA, the SA can transmit the control information of various data transmissions. If the data transmissions relate to TBs (transport blocks) different from each other, it may have a different RB size, a different MCS, and the like. In this case, since the amount of control information indicated by the SA is large, contents of the SA become large. As a result, efficiency of a resource can be degraded. In order to solve the problem, when the control information of various data transmissions is transmitted, it may be able to configure data to be transmitted from a single TB. In particular, since retransmission is performed for the same TB, it is not necessary to transmit any additional RB size, MCS, and the like. By doing so, it is able to more efficiently transmit the SA.

Figure 16:
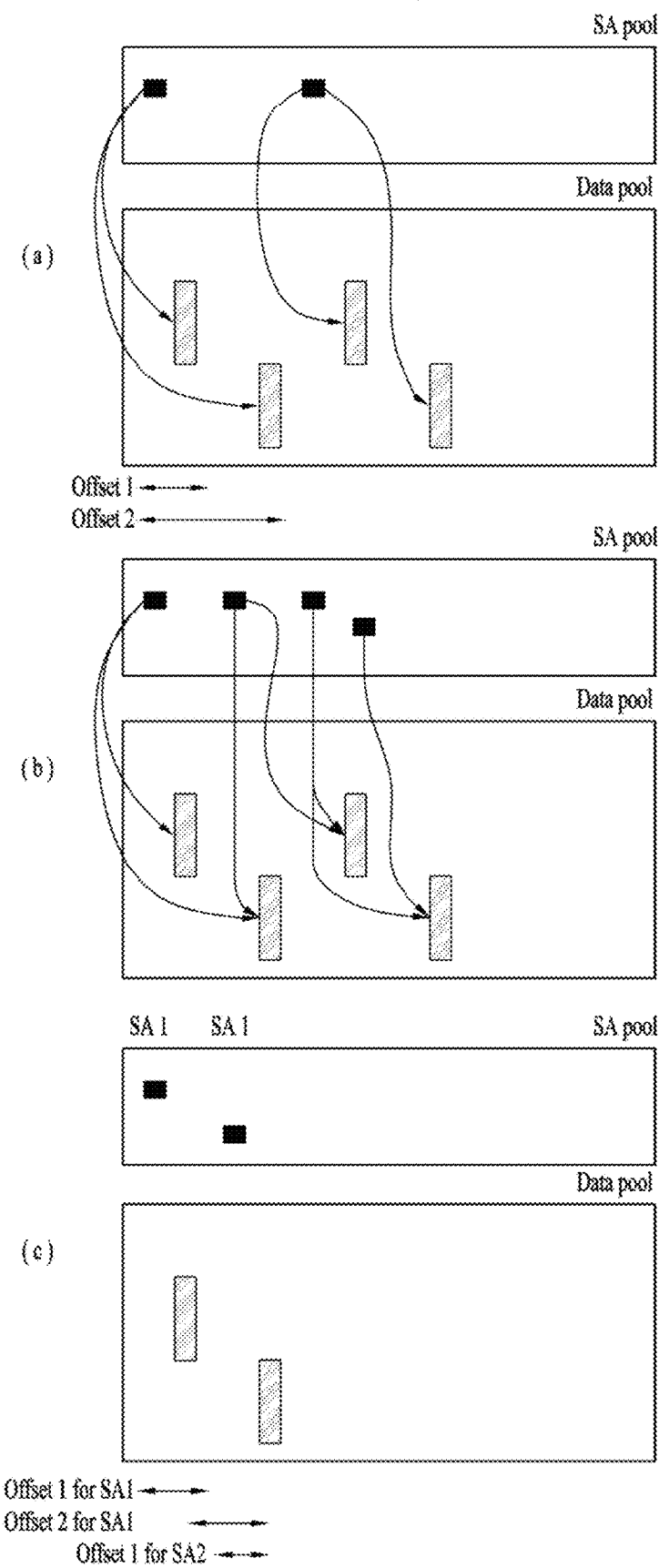

And, it may be able to set a limit on the maximum number of data scheduled by the SA. The limit can be determined in advance or can be configured by a network. For example, it may be able to determine a rule that one SA schedules data transmission maximum two times. In this case, it is necessary for the SA to indicate positions of time-frequency resources for the two data transmissions. In this case, if it is assumed that a size of a frequency resource, MCS, and the like are related to the same TB, the two transmissions can be sufficiently indicated by one indication. A position of a time resource can be represented in an offset form or a T-RPT form at a position at which the SA is transmitted. If the position of the time resource is represented in the offset form, offset 1 and offset 2 can be transmitted in a manner of being included in the SA. (If there are N number of data, N number of offsets can be included in the SA.) Or, the position of the time resource can be represented by an offset of data 1 or an offset between data 1 and data 2 in the SA. When the SA is transmitted several times, one SA may schedule the same number of data all the time and another specific SA may schedule a different number of data. For example, as shown in FIG. 16 (a), one SA may schedule 2 data all the time. Or, like the last SA transmission shown in FIG. 16 (b), specific SA may schedule one data only. In this case, it may indicate that scheduling is not performed using a specific state among offsets included in the SA. For example, if an offset is represented using two bits and two offsets are included in the SA, a specific bit state (00 or 11) of the second offset can be configured by a field indicating that there is no data. As a different method, a field indicating the number of scheduled data can be explicitly included in the SA. In this case, an offset can be fixed by a specific value in advance according to a corresponding field configuration or it may be able to determine a rule that a reception UE does not use the offset (the reception UE does not decode data at a position of the offset).

When a plurality of SAs schedule a specific data, if information indicated by a following SA is different from information indicated by a preceding SA, it is necessary to define an operation of a reception UE. For example, if the SAs indicate a different RA, MCS, and the like, it may be able to determine a rule that decoding is performed on the basis of the following (or, preceding) SA. Or, if the preceding SA and the following SA transmit different information at the same data position, it can be regarded as an error case. In particular, it may not perform data decoding or it may perform a different operation. Meanwhile, when SA is transmitted several times, an offset between first SA and first data can be configured to be identical to a space between second SA and second data. FIG. 16 (c) shows the embodiment mentioned above. An offset 1 for SA 1 and an offset 1 for SA 2 can be configured by the same value. In this case, a value of the offset 1 may not be signaled by the SA. The value can be determined in advance in a pool or can be signaled by a network. In this case, the SA signals a value of the offset 2 only. By doing so, it may be able to more efficiently configure fields of the SA.

The aforementioned methods can be classified into a case of transmitting SA and data in the same subframe and a case of transmitting the SA and the data in a different subframe. When the SA and the data are transmitted in the same subframe, a field indicating whether or not data associated with the SA is transmitted in the same subframe, the field indicating whether or not the data is transmitted in a next SA period, and the field indicating a subframe in which the data is transmitted after SA is transmitted can be transmitted in a manner of being included in the SA. The SA can indicate a transmission start point of the data. In this case, the transmission start point may indicate a position at which the data is transmitted or the timing at which a T-RPT bitmap starts.

When SA and data are transmitted in the same subframe, FIG. 17 illustrates a method of using an offset among methods of indicating a frequency domain resource position of the data. Specifically, a time offset can be determined in advance between SA and a data resource region or can be indicated by a network via physical layer signaling or higher layer signaling. In particular, if an offset is indicated between resource regions, as shown in FIG. 17 (b), while a position of a data transmitted in a different subframe is indicated, a frequency resource region of the data is indicated by a frequency resource region position of the SA. Meanwhile, although the offset between the SA resource and the data resource may correspond to a common value to a UE, the offset can be assigned to a specific UE only according to a priority of a UE or a message size. For example, when wideband data transmission is performed to transmit such a message as an event triggered message, if SA and data are transmitted in the same subframe, since coverage of the SA is not sufficient, a problem may occur in receiving the data. Hence, it may provide an offset between the SA and the data to separately transmit the SA and the data in a time domain. If a time domain offset is provided to a specific UE only, a field indicating whether or not the time domain offset is provided (between SA and data transmission) and/or a field indicating a size of the time domain offset can be transmitted in a manner of being included in the SA. Or, the information can be indicated to a reception UE by differently configuring a DMRS of the SA. According to the proposed method, since a resource position of data is indicated using a time/frequency resource position of the SA, it may be able to reduce the number of resource allocation information bits of data.

Meanwhile, if an offset between SA and data is determined in advance or is determined by a network, an offset between first SA and data may have such an offset form fixed between second SA and data. In particular, a first offset value of the second SA can be configured to be the same with an offset value of the first SA all the time. When a data resource is preferentially selected and then an SA resource is selected, if a plurality of data resources are selected, positions of a plurality of SA resources can be determined to be identical to an offset between the first SA resource and a data resource. By doing so, when a position of a data resource is selected and then a position of an SA resource is selected, a UE can simply implement a positon of an SA resource, which is transmitted several times. If a position of an SA resource is configured by the same offset, as an extreme case, it may not separately signal an offset value between SA and data.

Meanwhile, if SA and data are transmitted in the same subframe, it may use following methods to perform retransmission.

As a first method, when SA is transmitted by selecting a specific SA resource within an SA period according to a predetermined hopping pattern and data is transmitted in a subframe in which the SA is transmitted, if a resource position (logical index) of the data, MCS, and the like are identically configured at the time of retransmission, the SA can obtain a HARQ combining gain. Since the data is retransmitted at a position identical to a frequency position indicated by a first SA, the data can also obtain a HARQ combining gain. Currently, the SA allows two transmissions within an SA period. If retransmission of the SA is increased to 3 or 4 times, a hopping pattern for the retransmission can be determined in advance and the data can be transmitted in the subframe in which the SA is transmitted.

As a second method, a subframe index at which a next retransmission is to be performed or an offset can be transmitted in a manner of being included in every SA. In this case, not only a subframe in which a next retransmission is performed but also subframes in which N number of retransmissions are performed can be transmitted in a manner of being included in SA. According to the second method, since contents of SA vary according to each SA transmission, HARQ combining of SA is not mandatory. Yet, since data is retransmitted, HARQ combining of data is permitted.

Meanwhile, information such as frequency domain RA (resource allocation), MCS, NDI, and the like can be indicated using an RS sequence of a DMRS, or the like. Specifically, in order to indicate frequency domain RA information, it may differently configure a DMRS sequence according to RA. To this end, a candidate of a start point can be determined in advance according to an RA size and a different DMRS sequence can be configured according to the RA size. A reception UE performs blind decoding on the candidate and the DMRS sequence to identify RA. This method is not restricted to the RA. In particular, it may be able to differently configure an RS sequence according to MCS or NDI. The number of RS blind detection counts is restricted according to an RA size and a reception UE can perform blind detection on a DMRS from a predetermined start point according to an RA size. After the blind detection is performed according to RA, the reception UE performs data decoding on a DMRS sequence having the highest correlation value.

Figure 18:
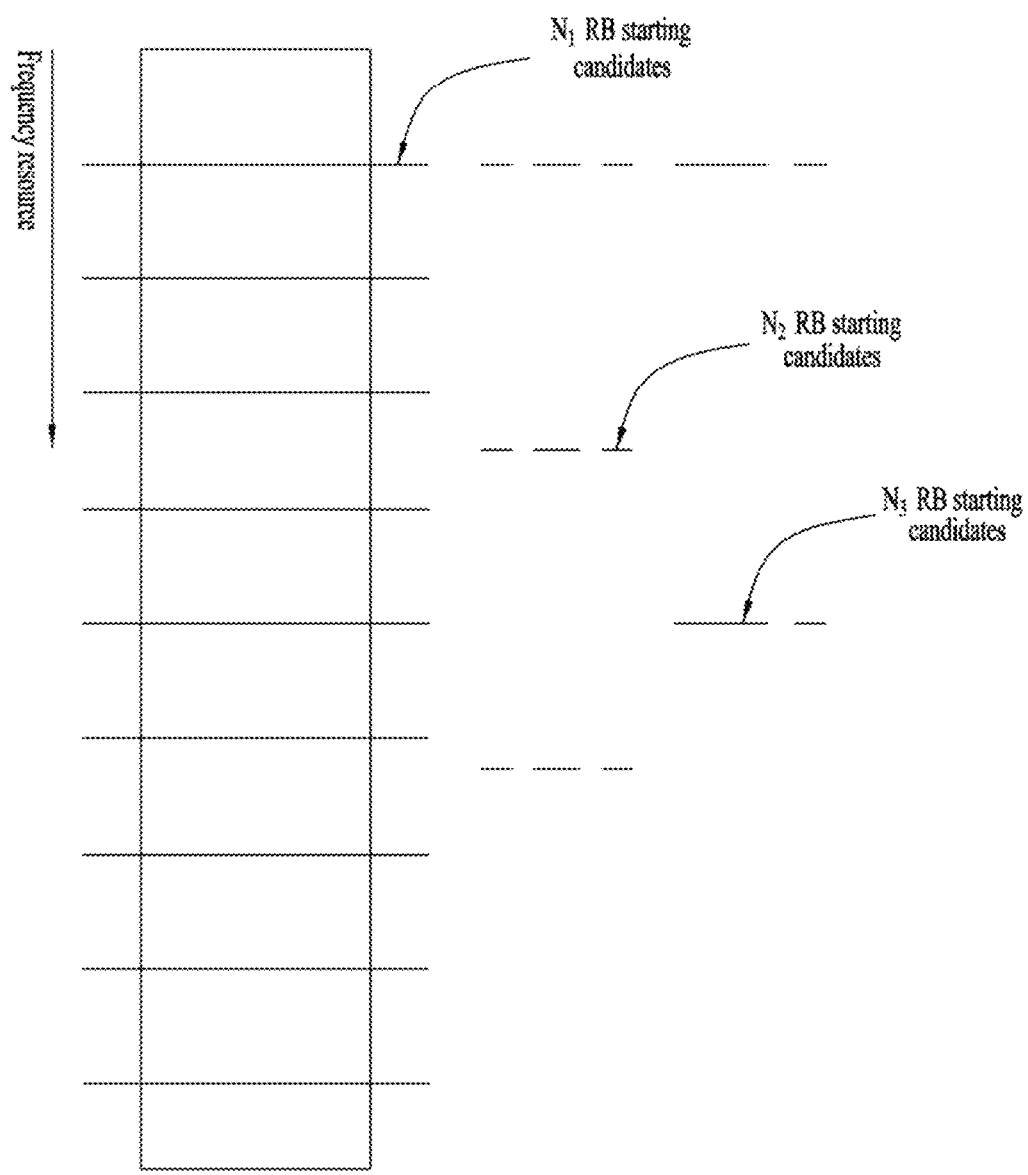

FIG. 18 illustrates a blind decoding candidate position for an RA start point in frequency domain. A start point of a predetermined position can be determined in advance according to an RB size or can be configured by a network. In this case, control information except RA can be transmitted in a subframe in which data is transmitted using a UCI piggyback scheme or a scheme of transmitting the control information by including the control information in a higher layer signal. In this case, RA information can also be included in the control information to check whether or not RA is correctly detected. Or, the RA information may not be included in the control information. This is because, if it fails to detect RA, since it also fails to decode data, CRC checking is failed. If RA is included in the control information, it may implicitly indicate that a CRC length is extended.

Scheme of Distinguishing SA Transmission from D2D Data Transmission in Time Axis It may be able to transmit all or a part of control information on following subframes (including a subframe in which D2D control information is transmitted) in every $N^{th}$ D2D subframe within a D2D resource pool period. For example, referring to FIG. 19 (a), it may be able to transmit a packet including information indicating T-RPT in every $N^{th}$ subframe. In this case, the N can be configured in advance or can be configured by a network. Referring to FIG. 19 (a), T-RPT indicates positions at which N−1 number of subframes are transmitted. As a different form, T-RPT may indicate positions at which N number of subframes are transmitted and a positon of the last 1 of the T-RPT may be able to determine in advance that next control information (T-RPT) is transmitted.

As shown in FIG. 19 (b), T-RPT can be transmitted in a plurality of subframes in every $N^{th}$ subframe to solve a half-duplex problem or obtain energy gain. In particular, it may be able to configure D2D control information to be transmitted in the first N1 number of is in the T-RPT. In this case, the N1 may correspond to a value determined in advance or the value configured by a network. A plurality of the subframes can be continuously transmitted in time domain or can be transmitted in subframes apart from each other in timely manner. In this case, a packet, which is transmitted to transmit D2D control information, may have a separate format (e.g., a format for separately transmitting D2D control information, e.g., PSCCH or PSCCH of a new form). Or, similar to UCI piggyback scheme, T-RPT information can be transmitted in a manner of being included in a partial RE. In this case, as shown in FIG. 20 (a), the UCI piggyback scheme corresponds to a method of using a part of REs near a DMRS to transmit HARQ ACK or an RI. Or, as shown in FIG. 20 (b), the UCI piggyback scheme corresponds to a method of using a part of REs from a lower subcarrier of a lowest RB using time first mapping to transmit a control signal. In D2D, it may be able to indicate all or a part of D2D data control information using one of two schemes (a method of using REs in a lowest RB similar to CQI piggyback scheme and a method of using REs near a DRS similar to PMI/RI/ACK).

In a subframe in which T-RPT is transmitted, not only the T-RPT but also information indicating MCS of a packet to be transmitted in a following subframe, a redundancy version (RV), transmit power, transmission number per MAC PDU, RV cycling type (information indicating whether RV is transmitted in a manner of being fixed or in a manner of varying), and the like can be transmitted. Information indicating the T-RPT may indicate a transmission position in a following N−1 subframe in a bitmap form.

When all UEs transmit SA in the same subframe, if a UE transmits control information to the same subframe, since the UE is unable to listen to a control signal of a different UE due to a half-duplex constraint, the UE fails to receive a data. Hence, in FIG. 19 (a), it is preferable to apply a hopping scheme to control information which is transmitted to N1 number of subframes to solve the half-duplex constraint that changes a subframe position according to a period of N number of subframes. Or, as shown in FIG. 21 (a), it may consider a method of differently applying an offset of a subframe in which control information is transmitted according to a UE. In this case, an offset of a subframe in which control information is transmitted can be differently configured in every N subframes. For example, it may be able to configure a different offset according to a UE due to a Tx UE ID, an Rx UE ID, a UE group ID, or a parameter configured by a network. The offset may vary with a period of N number of subframes (a predetermined period or a period of transmitting a message by a UE). As shown in FIG. 21 (b), if a different offset hopping pattern is applied to each UE, it may be able to prevent SA from being transmitted in the same subframe.

Meanwhile, a subframe period for transmitting control information can be configured in a unit of a MAC PDU. In other word, D2D control information can be newly transmitted whenever a new MAC PDU is transmitted. The D2D control information can indicate a subframe position (T-RPT) at which D2D data is transmitted in a following subframe, MCS, and the like.

Meanwhile, partial control information is transmitted via SA. In case of changing a transmission parameter within an SA period, it may transmit control information in the middle of transmitting data. Specifically, when an SA resource pool is defined and basic control information is transmitted in a corresponding region, if a packet transmission parameter is changed, the control information can be transmitted together with a packet. Or, the control information can be transmitted to a previous subframe of a subframe in which the packet is transmitted. For example, it may change RV, transmit power, and MCS. The control information can be transmitted in a manner of being included in the aforementioned UCI piggyback scheme or an MAC header region. A positon of a transmitted resource can be changed within an SA period. In this case, it may be able to transmit T-RPT for T number of upcoming subframes. The T-RPT can be transmitted in a manner of being included in a UCI piggyback scheme, a MAC header, or a MAC control signal.

Meanwhile, D2D control information can indicate contents for X number of upcoming subframes (sliding window scheme). According to the present scheme, D2D control information and data can be transmitted together in every subframe. In this case, although a reception UE starts to receive a certain subframe, since X number of control information is transmitted together, the reception UE is able to perform decoding. Although a transmission UE changes a transmission parameter, the reception UE can immediately apply the transmission parameter.

Figure 22:
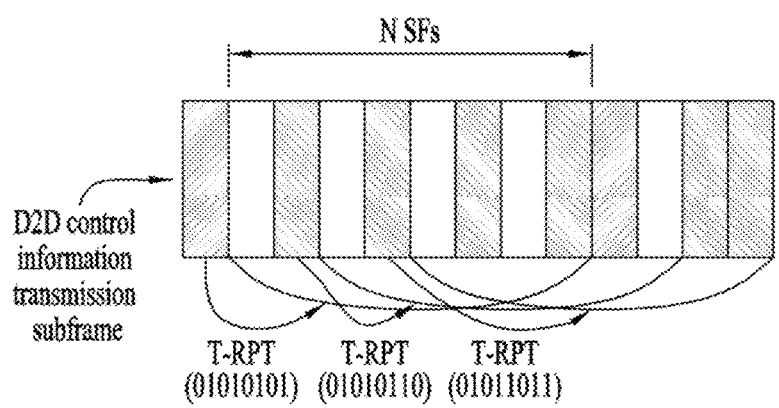

Specifically, the control information can be transmitted together with a data region by applying separate channel coding to the control information or can be transmitted together with data via higher layer signaling. For example, the control information can be transmitted to a MAC header or a MAC control region. Or, the control information can be transmitted using such separate channel coding or a separate channel structure as PUSCH and PUCCH to a separate RB or group of REs. In this case, similar to multi cluster transmission, it may assume that the control information and the data apply separate DFT spreading. FIG. 22 shows an example of the sliding window scheme. Referring to FIG. 22, it is able to see that T-RPT varies in every N number of subframes. In this case, it may be able to differently configure MCS, RV, and the like. The control information includes not only control information on X number of upcoming subframes but also control information on data of a subframe in which the control information is transmitted. In particular, the control information can indicate the X number of upcoming subframes including the data of the subframe in which the control information is transmitted.

FIG. 23 illustrates a method of performing TDM on a resource pool of SA and a resource pool of data in a subframe. In this case, a frequency domain start point of the SA may indicate a frequency domain start point of the data or a start point of the data can be implicitly indicated by a position of the SA. According to the present method, when UEs different from each other select a different data position in the same subframe, it may be able to prevent a collision between SAs. Or, SA can be transmitted at a predetermined position among frequency positions at which data is transmitted. For example, the SA can be transmitted at positions except a number of RBs located at both ends among the positions at which the data is transmitted. This is intended to reduce interference due to in-band emission between SAs. The present method can also be applied to a case that SA and data are transmitted in the same subframe in a manner of being FDM.

Or, SA may indicate the entire RA information of data. According to the present scheme, a frequency domain in which the SA and the data are transmitted may not be overlapped. It may be able to transmit not only control information on a subframe in which the SA is transmitted but also control information on the data for a following subframe in the SA. In this case, it may be able to transmit the data only in the following subframe without the SA and D2D control information on X number of subframes can be indicated in every subframe. FIG. 23 (b) illustrates an example for the abovementioned case. FIG. 23 (c) illustrates a case that data is transmitted to an SA transmission region in a subframe in which D2D control information is not transmitted. In this case, a transmission UE can perform encoding under the assumption that SA is not transmitted. In a subframe in which SA is transmitted, rate matching or puncturing can be performed on an RE of a symbol in which the SA is transmitted. Yet, in a subframe in which the SA is not transmitted, rate matching or puncturing can be always performed on a region in which the SA is transmitted to protect SA transmission of a different UE.

A position at which SA is transmitted may correspond to a symbol(s) near a DMRS rather than a first symbol of a subframe. In order to enhance decoding performance of SA, it may transmit an additional RS. A position of the additional RS can be transmitted to a different symbol other than a legacy DMRS and the position can be determined in advance. If SA and data are transmitted in the same subframe, transmit power can be identically maintained. In this case, an RB size of the SA may correspond to a predetermined size. If the RB size of the SA is different from an RB size of the data in frequency domain, PSD (power spectral density) of the SA may differ from PSD of the data.

Other Method

Figure 24:
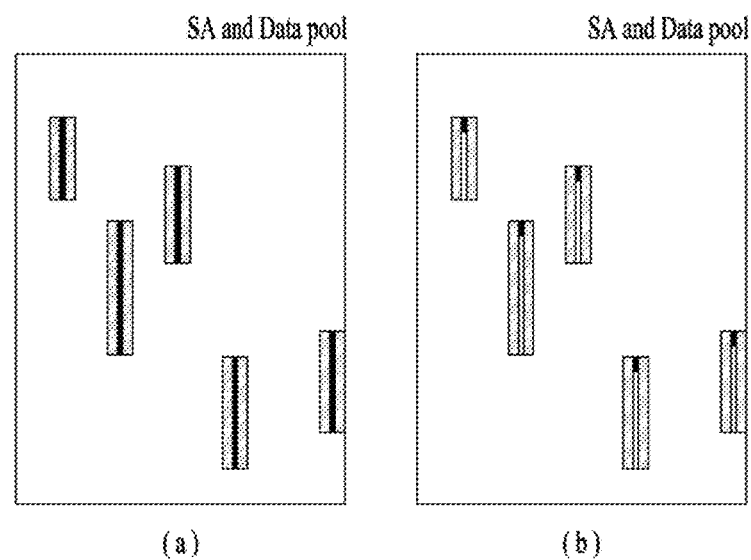
FIG. 24 is a diagram illustrating a different scheme.

As a different example of a scheme of transmitting D2D control information, control information and data can be separately transmitted in time domain. FIG. 24 (a) shows an embodiment for the scheme. According to the scheme shown in FIG. 24, data is distinguished from control information in time domain. The data is decoded after the control information is decoded. And, similar to multi cluster transmission, the scheme has an advantage in that PARR does not increase. Since the control information is more important for performing decoding, the control information can be transmitted at a predetermined symbol near a DMRS. However, since a region at which the control information is transmitted varies according to an RA size, it may have a demerit in that data efficiency is degraded. In order to supplement the demerit, it may fix a size of frequency domain in which the control information is transmitted and data can be transmitted in a manner of being mapped to the remaining REs. FIG. 24 (b) shows an example of the abovementioned scheme. If TDM is performed on the SA and the data in a subframe, the SA and the data may have different transmit power. In this case, a power transient period can be assigned to a data region.

Examples for the aforementioned proposed methods can also be included as one of implementation methods of the present invention. Hence, it is apparent that the examples are regarded as a sort of proposed schemes. The aforementioned proposed schemes can be independently implemented or can be implemented in a combined (aggregated) form of a part of the proposed schemes. It may be able to configure an eNB to inform a UE of information on whether to apply the proposed methods (information on rules of the proposed methods) via a predefined signal (e.g., physical layer signal or upper layer signal).

Configurations of Devices for Embodiments of the Present Invention

Figure 25:
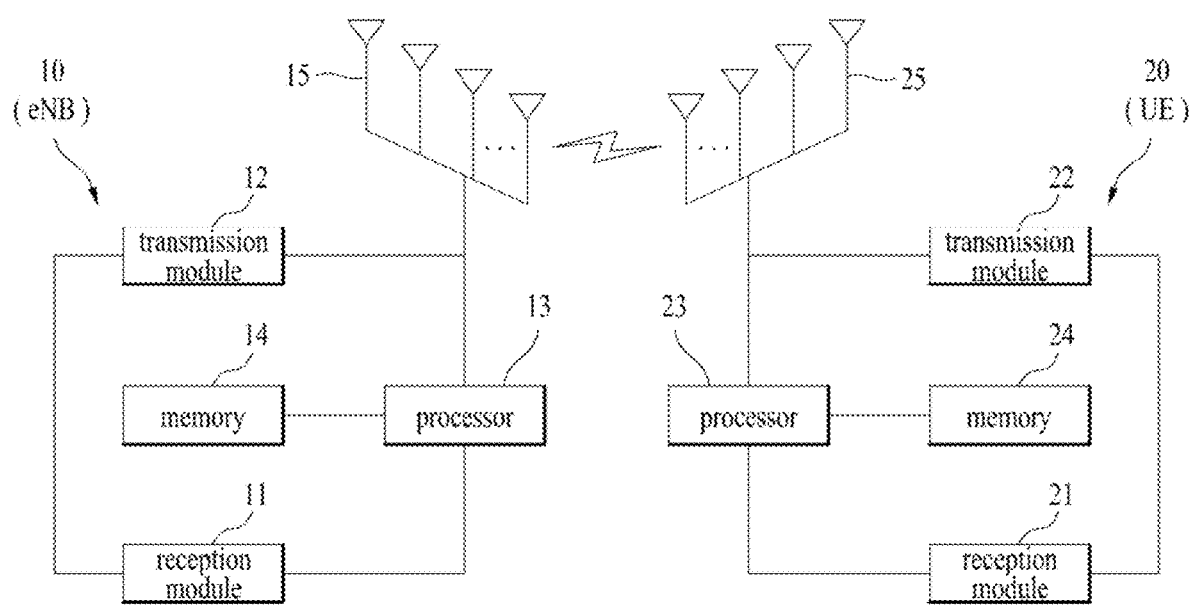
FIG. 25 is a diagram for configurations of a transmitter and a receiver.

FIG. 25 is a diagram for configurations of a transmitter and a receiver.

Referring to FIG. 25, a transmit point apparatus 10 may include a receive module 11, a transmit module 12, a processor 13, a memory 14, and a plurality of antennas 15. The antennas 15 represent the transmit point apparatus that supports MIMO transmission and reception. The receive module 11 may receive various signals, data and information from a UE on an uplink. The transmit module 12 may transmit various signals, data and information to a UE on a downlink. The processor 13 may control overall operation of the transmit point apparatus 10.

The processor 13 of the transmit point apparatus 10 according to one embodiment of the present invention may perform processes necessary for the embodiments described above.

Additionally, the processor 13 of the transmit point apparatus 10 may function to operationally process information received by the transmit point apparatus 10 or information to be transmitted from the transmit point apparatus 10, and the memory 14, which may be replaced with an element such as a buffer (not shown), may store the processed information for a predetermined time.

Referring to FIG. 25, a UE 20 may include a receive module 21, a transmit module 22, a processor 23, a memory 24, and a plurality of antennas 25. The antennas 25 represent the UE that supports MIMO transmission and reception. The receive module 21 may receive various signals, data and information from an eNB on a downlink. The transmit module 22 may transmit various signals, data and information to an eNB on an uplink. The processor 23 may control overall operation of the UE 20.

The processor 23 of the UE 20 according to one embodiment of the present invention may perform processes necessary for the embodiments described above.

Additionally, the processor 23 of the UE 20 may function to operationally process information received by the UE 20 or information to be transmitted from the UE 20, and the memory 24, which may be replaced with an element such as a buffer (not shown), may store the processed information for a predetermined time.

The configurations of the transmit point apparatus and the UE as described above may be implemented such that the above-described embodiments can be independently applied or two or more thereof can be simultaneously applied, and description of redundant parts is omitted for clarity.

Description of the transmit point apparatus 10 in FIG. 25 may be equally applied to a relay as a downlink transmitter or an uplink receiver, and description of the UE 20 may be equally applied to a relay as a downlink receiver or an uplink transmitter.

The embodiments of the present invention may be implemented through various means, for example, hardware, firmware, software, or a combination thereof.

When implemented as hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented as firmware or software, a method according to embodiments of the present invention may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention. For example, those skilled in the art may use a combination of elements set forth in the above-described embodiments. Thus, the present invention is not intended to be limited to the embodiments described herein, but is intended to accord with the widest scope corresponding to the principles and novel features disclosed herein.

The present invention may be carried out in other specific ways than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein. The present invention is not intended to be limited to the embodiments described herein, but is intended to accord with the widest scope consistent with the principles and novel features disclosed herein. In addition, claims that are not explicitly cited in each other in the appended claims may be presented in combination as an embodiment of the present invention or included as a new claim by subsequent amendment after the application is filed.

INDUSTRIAL APPLICABILITY

The embodiments of the present invention can be applied to various mobile communication systems.

What is claimed is:

1. A method for transmitting a sidelink signal by a UE (user equipment) in a wireless communication system, comprising:
   selecting a plurality of time resources for initial transmission and retransmission for one TB (transport block);
   transmitting a PSCCH (physical sidelink control channel) and a PSSCH (Physical sidelink shared channel) in the plurality of time resources;
   wherein a first PSCCH is transmitted in a first time resource among the plurality of time resources,
   wherein the first PSCCH includes time resource allocation information for the PSSCH transmitted in the first time resource and time resource allocation information for at least one PSSCH retransmitted after the first time resource, and
   wherein a number of PSSCHs and PSCCHs to which time resources are allocated by the first PSCCH is limited within a preconfigured maximum number.

2. The method of claim 1, wherein the first PSCCH allocates a second time resource which the PSSCH is retransmitted through offset information between the first time resource and the second time resource.

3. The method of claim 1, wherein the first PSCCH includes time resource allocation information for the PSSCH retransmitted in a time resource adjacent to the first time resource among the plurality of time resources.

4. The method of claim 1, wherein, based on a number of time resources remaining after the first time resource among the plurality of time resources less than the preconfigured maximum number, the number of PSSCHs to which time resources are allocated by a second PSCCH transmitted after the first PSCCH is smaller than the number of PSSCHs to which time resources are allocated by the first PSSCH.

5. The method of claim 1, wherein control information related to a frequency resource size and a MCS (Modulation and Coding Scheme) for each of the PSSCHs is included only in the first PSCCH among PSCCHs transmitted in the plurality of time resources.

6. A user equipment for transmitting a sidelink signal in a wireless communication system, comprising:
   a transmitter and a receiver; and
   a processor,
   the processor configured to:
   select a plurality of time resources for initial transmission and retransmission for one TB (transport block), and
   control the transmitter to transmit a PSCCH (physical sidelink control channel) and a PSSCH (Physical sidelink shared channel) in the plurality of time resources,
   wherein a first PSCCH is transmitted in a first time resource among the plurality of time resources,
   wherein the first PSCCH includes time resource allocation information for the PSSCH transmitted in the first time resource and time resource allocation information for at least one PSSCH retransmitted after the first time resource, and
   wherein a number of PSSCHs and PSCCHs to which time resources are allocated by the first PSCCH is limited within a preconfigured maximum number.

7. The user equipment of claim 6, the first PSCCH allocates a second time resource through offset information between the first time resource and the second time resource which the PSSCH is retransmitted.

8. The user equipment of claim 6, wherein the first PSCCH includes time resource allocation information for the PSSCH retransmitted in a time resource adjacent to the first time resource among the plurality of time resources.

9. The user equipment of claim 6, wherein, based on a number of time resources remaining after the first time resource among the plurality of time resources less than the preconfigured maximum number, the number of PSSCHs to which time resources are allocated by a second PSCCH transmitted after the first PSCCH is smaller than the number of PSSCHs to which time resources are allocated by the first PSSCH.

10. The method of claim 1, based on the preconfigured maximum number being smaller than the plurality of time resources, the number of PSSCHs and the PSCCHs to which time resources are allocated by the first PSSCH is limited within the preconfigured maximum number.

* * * * *